(12) United States Patent
Abney et al.

(10) Patent No.: US 11,891,407 B2
(45) Date of Patent: Feb. 6, 2024

(54) METHODS OF SYNTHESIZING AND RECYCLING METAL-ORGANIC FRAMEWORK SYSTEMS

(71) Applicant: ExxonMobil Technology and Engineering Company, Annandale, NJ (US)

(72) Inventors: Carter W. Abney, Athens, WI (US); Joseph M. Falkowski, Hampton, NJ (US); Mary S. Abdulkarim, Palisades, NJ (US); Anna C. Ivashko, Denville, NJ (US); Julie J. Seo, Clinton, NJ (US); Aaron W. Peters, New Hope, NJ (US); Matthew T. Kapelewski, Lambertville, NJ (US); Gerardo J. Majano Sanchez, Basking Ridge, NJ (US); Wesley Sattler, Bedminster, NJ (US); Simon C. Weston, Annandale, NJ (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 174 days.

(21) Appl. No.: 17/400,742

(22) Filed: Aug. 12, 2021

(65) Prior Publication Data
US 2022/0048929 A1 Feb. 17, 2022

Related U.S. Application Data

(60) Provisional application No. 62/706,389, filed on Aug. 13, 2020.

(51) Int. Cl.
*B01J 20/22* (2006.01)
*B01J 20/30* (2006.01)
(Continued)

(52) U.S. Cl.
CPC .............. *C07F 3/02* (2013.01); *B01D 53/04* (2013.01); *B01J 20/226* (2013.01); *C01B 37/00* (2013.01);
(Continued)

(58) Field of Classification Search
CPC ............. B01D 53/04; B01D 2253/204; B01D 2257/504; C01B 37/00; C07F 3/02;
(Continued)

(56) References Cited

U.S. PATENT DOCUMENTS

| 8,653,292 B2 | 2/2014 | Hafizovic et al. |
| 10,780,388 B2 | 9/2020 | Long et al. |

(Continued)

FOREIGN PATENT DOCUMENTS

| WO | 2013/059527 A1 | 4/2013 |
| WO | WO2015/166015 | * 11/2015 |

(Continued)

OTHER PUBLICATIONS

U.S. Appl. No. 62/579,717.
(Continued)

*Primary Examiner* — Frank M Lawrence, Jr.
(74) *Attorney, Agent, or Firm* — Shook, Hardy & Bacon L.L.P.

(57) ABSTRACT

Provided herein are methods of novel methods of synthesizing a metal-organic framework system by vapor-phase appending of a plurality of ligands appended to a metal-organic framework. Also, provided are methods of recycling metal-organic framework systems by detaching the ligand and re-appending the same ligand or appending a different ligand to the metal-organic framework to provide a recycled or repurposed metal-organic framework system.

23 Claims, 21 Drawing Sheets

(51) Int. Cl.
  C07F 3/02 (2006.01)
  B01D 53/04 (2006.01)
  C01B 37/00 (2006.01)
(52) U.S. Cl.
  CPC .. *B01D 2253/204* (2013.01); *B01D 2257/504* (2013.01)
(58) Field of Classification Search
  CPC ..... Y02C 20/40; B01J 20/226; B01J 20/3085; B01J 20/3433; B01J 20/3475
  USPC .......................................................... 502/401
  See application file for complete search history.

(56) References Cited

U.S. PATENT DOCUMENTS

| | | |
|---|---|---|
| 2007/0202038 A1 | 8/2007 | Yaghi et al. |
| 2010/0307336 A1 | 12/2010 | Ni et al. |
| 2016/0031920 A1 | 2/2016 | Nandi et al. |
| 2018/0272314 A1 | 9/2018 | Long et al. |
| 2019/0039015 A1 | 2/2019 | Long et al. |
| 2019/0126237 A1 | 5/2019 | Weston et al. |
| 2022/0040668 A1* | 2/2022 | Weston ................... B01D 53/02 |
| 2022/0176343 A1 | 6/2022 | Weston et al. |
| 2022/0372314 A1* | 11/2022 | Weston ................... B33Y 70/00 |

FOREIGN PATENT DOCUMENTS

| | | |
|---|---|---|
| WO | 2019/028421 A1 | 2/2019 |
| WO | 2020/205699 A1 | 10/2020 |
| WO | 2020/205702 A | 10/2020 |
| WO | 2020/219907 A | 10/2020 |
| WO | 2021/011111 A1 | 1/2021 |
| WO | 2022/036094 A1 | 2/2022 |

OTHER PUBLICATIONS

Long, et al., "Capture of Carbon Dioxide from Air and Flue Gas in the Alkylamine-Appended Metal-Organic Framework mmen-Mg2(dobpdc)" Journal of the American Chemical Society, vol. 134, pp. 7056-7065, 2012.
Long et al., "Cooperative insertion of CO2 in diamine appended metal-organic frameworks" Nature, vol. 519, 3pp.03-308, 2015.
Long, et al., "Controlling Cooperative CO2 Adsorption in Diamine-Appended Mg2(dobpdc) Metal-Organic Frameworks", Journal of the American Chemical Society, vol. 139, pp. 10526-10538, 2017.
Long, et al., "A Diaminopropane-Appended Metal-Organic Framework Enabling Efficient CO2 Capture from Coal Flue Gas via a Mixed Adsorption Mechanism", Journal of the American Chemical Society, vol. 139, pp. 13541-13553, 2017.
Long, et al., "Overcoming double-step CO2 adsorption and minimizing water co-adsorption in bulky diamineappended variants of Mg2(dobpdc)", Journal of the American Chemical Society, vol. 9, pp. 160-174, 2018.
Brunauer, S. et al.,(1938), "Adsorption of gases in multimolecular layers", Journal of the American chemical society, vol. 60, No. 2, pp. 309-319.
Gregg, S. J. et al., (1982) "Adsorption, surface and porosity", 2nd Edition, Academic Press Inc., New York, 313 Pages.
Karagiaridi, O. et al., (2014) "Solvent-assisted linker exchange: an alternative to the de novo synthesis of unattainable metal-organic frameworks", Angewandte Chemie International Edition, No. 53, No. 18, pp. 4530-4540.
Langmuir, I., (1916) "The Constitution and Fundamental Properties of Solids and Liquids. Part I. Solids.", Journal of the American chemical society, vol. 38, No. 11, pp. 2221-2295.
International Search Report and Written Opinion received for PCT Application No. PCT/US2021/045741, dated Nov. 26, 2021, 20 Pages.
Walton, K. S. et al., (2007) "Applicability of the BET method for determining surface areas of microporous metal-organic frameworks", Journal of the American Chemical Society, vol. 129, No. 27, pp. 8552-8556.
Wu, W. et al., (2020) "Vapor-phase linker exchange of metal-organic frameworks", Science advances, vol. 6, No. 18, pp. 1-8.

* cited by examiner

`US 11,891,407 B2`

METHODS OF SYNTHESIZING AND RECYCLING METAL-ORGANIC FRAMEWORK SYSTEMS

CROSS-REFERENCE TO RELATED APPLICATIONS

This application claims priority to and the benefit of U.S. Provisional Application No. 62/706,389, filed on Aug. 13, 2020, the disclosure of which is incorporated herein by reference in its entirety.

FIELD OF THE INVENTION

The present invention relates to carbon dioxide absorbents comprising metal-organic framework systems, and more particularly, metal-organic framework systems based on MOF-274 metal-organic frameworks with diamine appended ligands and methods of making and recycling the same.

BACKGROUND OF THE INVENTION

Amine-appended metal-organic framework systems based on the metal-organic framework, MOF-274 are leading candidates for selective $CO_2$ capture from flue gas. Traditionally, this material has been formed by dispersing the nascent metal-organic framework in an amine-containing non-coordinating solvent, followed by repetitive washing. Various amines have been demonstrated, though inclusion of tetramines requires an additional post-appending heating to liberate excess amines and generate the desired loading. When successfully functionalized, these amine-appended metal-organic frameworks display unique type-V isotherms for $CO_2$, selectively binding them over $N_2$ or $O_2$.

A congener of MOF-274 comprising salicylates bridged by an ethylenediimine core shares some of the same qualities of the MOF-274 metal-organic framework including the ability to append amines onto the framework. These amine-appended absorbent materials are useful to capture $CO_2$ from a carbon dioxide-containing stream with high capacities and with a type-V isotherm. Higher boiling or more polar solvents such as diisopropylbenzene or butanol have been used, but drastically reduced crystallinity results.

Furthermore, cycling the amine-appended MOF results in progressive amine loss over time, deactivating the material for the desired separation. In certain systems, contacting the metal-organic framework system with steam to desorb bound $CO_2$ accelerates amine loss. Additionally, some metal-organic frameworks in the MOF-274 family display limited stability and undergo decomposition upon exposure to solvent, preventing successful amine appending and subsequent use for $CO_2$ capture.

Moreover, for $CO_2$ capture applications, the metal-organic framework MOF-274 functionalized with a diamine can afford desirable Type-V isotherm. However, installation of different diamines changes the adsorbent properties, including impartation of steam stability or variation of the $CO_2$ partial pressure/temperature needed to effect $CO_2$ adsorption. This versatility allows the diamine-appended MOF-274 metal-organic framework system to have potential utility for $CO_2$ capture from a wide range of different streams. Nevertheless, once the metal-organic framework, MOF-274, is appended with a selected amine, the current paradigm is that the material remains in that particular form throughout the duration of its use.

Little attention has been given to the recycle of the spent diamine-appended MOF-274 metal-organic framework system, or the intentional stripping of the amine from metal-organic framework system for the purposes of loading a different diamine and achieving different performance. Further, as new advantaged amine-appended MOF-274 metal-organic framework systems are discovered, the ability to upgrade the adsorbent system through installation of new diamines, eliminating de novo MOF synthesis, will minimize expense, waste, and adsorbent downtime.

A need exists, therefore, for methods of synthesizing new or existing metal-organic frameworks which can be cycled without amine loss over-time, and/or recycled and/or re-purposed with a different amine for use in the same or different $CO_2$ capture conditions.

SUMMARY OF THE INVENTION

Provided herein are methods of synthesizing a metal-organic framework system comprising a metal-organic framework and a plurality of ligands vapor-phase appended to the metal-organic framework. Also provided are methods of recycling and/or repurposing the metal-organic framework system. The metal-organic framework has a plurality of one or more distinct metallic elements and a plurality of linkers. Each of the plurality of one or more distinct metallic elements are bridged by one or more of the plurality of linkers to form an open metal site. In an aspect, the metal-organic framework system comprises a diamine appended to the open metal site of the metal-organic framework. In an aspect, the plurality of one or more distinct metallic elements comprise magnesium, zinc, nickel, copper, and/or a combination thereof. In an aspect, the distinct metallic element is Mg. In an aspect, the plurality of ligands are amines or an alcohol.

The present methods comprise the steps of: (a) providing a metal-organic framework comprising at least one open metal site; and (b) appending a ligand in a vapor-phase to the metal-organic framework at the open metal site to form the metal-organic framework system.

Further, provided herein are methods making a metal-organic framework system comprising the steps of: (a) making a metal-organic framework; (b) evaporating a plurality of ligands to produce a vapor-phase; and (c) in the vapor-phase, binding the at least one of the plurality of ligands to the at least one of the open metal sites of the metal-organic framework to form the metal-organic framework system. The metal-organic framework comprises a plurality of open metal sites wherein a linker bridges at least one of the plurality of the open metal sites to another. In an aspect, the method can further comprise the step of suspending the metal-organic framework in a solvent. In an aspect, the method can further comprise the step of filtering the solvent from the metal-organic framework. In an aspect, the method can further comprise the plurality of ligands heated to form the vapor-phase. In an aspect, the method can further comprise the pressure reduced so the plurality of ligands form the vapor-phase. In an aspect, the method can further comprise an inert gas passes through the vapor-phase.

The present novel methods can produce a novel metal-organic framework system that comprises a metal-organic framework having metal ions linked together with ethyne-diiminebissalicylic acid forming the plurality of open metal sites which are appended in the vapor-phase with 2-aminomethyl piperidine and/or N,N-dimethylethylenediamine. As such, novel metal-organic framework systems comprising a magnesium variant of a MOF-274 metal-organic framework appended with 2-aminomethyl piperidine and/or N,N-dimethylethylenediamine are provided.

In addition, provided herein methods of recycling or repurposing a metal-organic framework system comprising the steps of: (a) detaching a plurality of first appended ligands from the metal-organic framework system to provide a metal-organic framework where the metal-organic framework structure remains intact; and (b) appending at least one of a plurality of second appended ligands to the metal-organic framework to produce a recycled metal-organic framework system. In an aspect, the recycling methods further comprise the step of sequential soaking of the metal-organic framework system and metal-organic framework to provide a recycled metal-organic framework system. In an aspect, the methods further comprise the step of washing the metal-organic framework system in solvent to remove the plurality of first appended ligands. In an aspect, these methods further comprise the step of appending the at least one plurality of second appended ligands to the metal-organic framework in a vapor-phase. In an aspect, the plurality of first appended ligands are spent diamine-appended ligands. In an aspect, the plurality of second appended ligands are the plurality of first appended ligands recycled. In an aspect, the plurality of first appended ligands are different than the plurality of second appended ligands.

In an aspect, the linker is a multidentate organic ligand comprising a first binding site and a second binding site that are bridged together with a third binding site. In an aspect, the first binding site and second binding site of the multidentate organic ligand each comprise a salicylate moiety and the third binding site comprises a diamine moiety. In an aspect, the multidentate organic linker is 5, 5'-(((1E,2E)-ethane-1,2-diylidene)bis-(azaneylylidene))bis(2-hydrozybenzoic acid).

BRIEF DESCRIPTION OF THE DRAWINGS

FIG. 1A is the isotherm on a linear pressure scale. FIG. 1B is on a logarithmic pressure scale.

DETAILED DESCRIPTION OF THE INVENTION

Figure 1A:
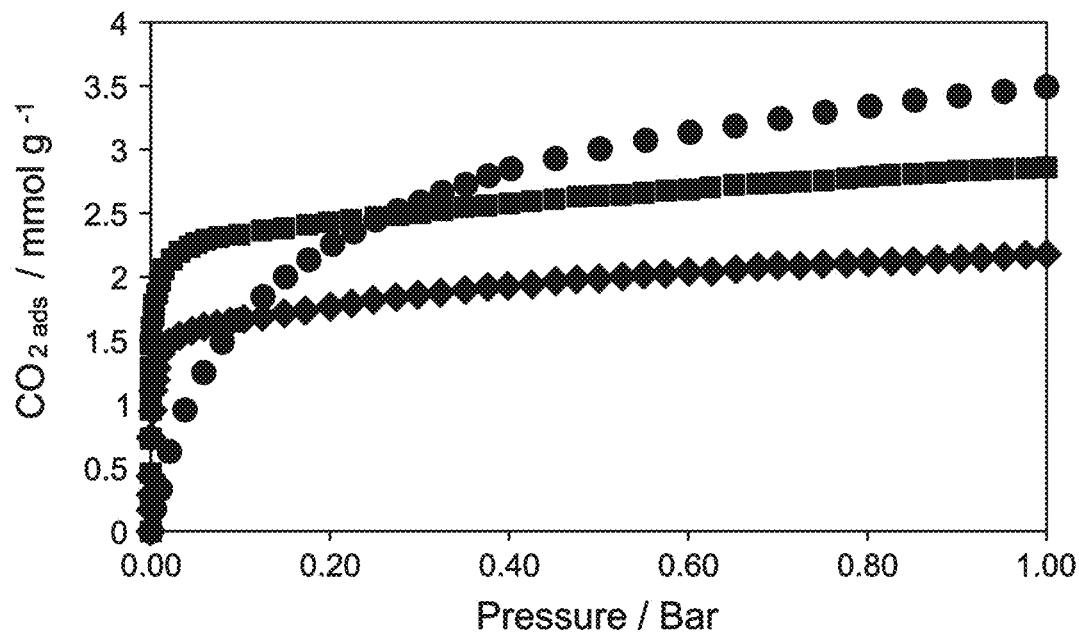
FIG. 1A and FIG. 1B are isotherms conducted at 50° C. of a metal-organic framework of Example 1, a metal-organic framework system where the metal-organic framework of Example 1 was appended with the ligand, N,N-dimethylethylenediamine, and the metal-organic framework system where the metal organic framework of Example 1 was appended with the ligand 2-aminomethylpiperidine (2-ampd).

For the purposes of this disclosure, the following definitions will apply:

As used herein, the terms "a" and "the" as used herein are understood to encompass the plural as well as the singular.

The term "aryl" means, unless otherwise stated, a polyunsaturated, aromatic substituent that can be a single ring or multiple rings fused together or linked covalently. In an aspect, the substituent has from 1 to 11 rings, or more specifically, 1 to 3 rings. The term "heteroaryl" refers to aryl substituent groups (or rings) that contain from one to four heteroatoms selected from N, O and S, wherein the nitrogen and sulfur atoms are optionally oxidized, and the nitrogen atom(s) are optionally quaternized. An exemplary heteroaryl group is a six-membered azine, e.g., pyridinyl, diazinyl and triazinyl. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

As used herein, the terms "alkyl," "aryl," and "heteroaryl" can optionally include both substituted and unsubstituted forms of the indicated species. Substituents for the aryl and heteroaryl groups are generically referred to as "aryl group substituents." The substituents are selected from, for example: groups attached to the heteroaryl or heteroarene nucleus through carbon or a heteroatom (e.g., P, N, O, S, Si, or B) including, without limitation, substituted or unsubstituted alkyl, substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NR—C(NR'R"R'")'NR"", —NR—C(NR'R")=NR'", —S(O)R', —S(O)R', —S(O)NR'R", —NRSOR', —CN and, —R', —, —CH(Ph), fluoro($C_1$-$C_4$)alkoxy, and fluoro($C_1$-$C_4$)alkyl, in a number ranging from zero to the total number of open valences on the aromatic ring system. Each of the above-named groups is attached to the aryl or heteroaryl nucleus directly or through a heteroatom (e.g., P, N, O, S, Si, or B); and where R', R", R'" and R"" are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R'" and R"" groups when more than one of these groups is present.

The term "alkyl," by itself or as part of another substituent, means, unless otherwise stated, a straight or branched chain, or cyclic hydrocarbon radical, or combination thereof, which may be fully saturated, mono- or polyunsaturated and can include di-, tri- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to optionally include those derivatives of alkyl defined in more detail below, such as "heteroalkyl."

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si and S, and wherein the nitrogen and sulfur atoms may optionally be oxidized and the nitrogen heteroatom may optionally be quaternized. The heteroatom(s) O, N and S and Si may be placed at any interior position of the heteroalkyl group or at the position at which the alkyl group is attached to the remainder of the molecule. Examples include, but are not limited to, —CH$_2$—CH$_2$—O—CH$_3$, —CH$_2$—CH$_2$—NH—CH$_3$, —CH$_2$—CH$_2$—N(CH$_3$)—CH$_3$, —CH$_2$—S—CH$_2$—CH$_3$, —CH$_2$—CH$_2$, —S(O)—CH$_3$, —CH$_2$—CH$_2$—S(O)$_2$—CH$_3$, —CH=CH—O—CH$_3$, —Si(CH$_3$)$_3$, —CH$_2$—CH=N—OCH$_3$, and —CH=CH—N(CH$_3$)—CH$_3$. Up to two heteroatoms may be consecutive, such as, for example, —CH$_2$—NH—OCH$_3$ and —CH$_2$—O—Si(CH$_3$)$_3$. Similarly, the term "heteroalkylene" by itself or as part of another substituent means a divalent radical derived from heteroalkyl, as exemplified, but not limited by, —CH$_2$—CH$_2$—S—CH$_2$—CH$_2$— and —CH$_2$—S—CH$_2$—CH$_2$—NH—CH$_2$—. For heteroalkylene groups, heteroatoms can also occupy either or both chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —CO$_2$R'— represents both —C(O)OR' and —OC(O)R'.

As used herein, the term "heteroatom" includes oxygen (O), nitrogen (N), sulfur (S) and silicon (Si), boron (B) and phosphorous (P).

As used herein, the term "ligand" means a molecule containing one or more substituent groups capable of functioning as a Lewis base (electron donor). In an aspect, as provided herein, the ligand can be an amine or amines containing 1 to 10 amine groups.

The terms "halo" or "halogen," by themselves or as part of another substituent, mean, unless otherwise stated, a fluorine, chlorine, bromine, or iodine atom.

The symbol "R" is a general abbreviation that represents a substituent group that is selected from H, substituted or unsubstituted alkyl, substituted or unsubstituted heteroalkyl, substituted or unsubstituted aryl, substituted or unsubstituted heteroaryl, and substituted or unsubstituted heterocycloalkyl groups.

As used herein, the term "Periodic Table" means the Periodic Table of the Elements of the International Union of Pure and Applied Chemistry (IUPAC), dated December 2015.

As used herein, an "isotherm" refers to the adsorption of an adsorbate as function of concentration while the temperature of the system is held constant. In an aspect, the adsorbate is $CO_2$ and concentration can be measured as $CO_2$ pressure. As described herein, isotherms can be performed with porous materials and using various mathematical models applied to calculate the apparent surface area. S. Brunauer, P. H. Emmett, and E. Teller. *J. Am. Chem. Soc.* 1938, 60, 309-319; K. Walton and R. Q. Snurr, *J. Am. Chem. Soc.* 2007, 129, 8552-8556; I. Langmuir, *J. Am. Chem. Soc.* 1916, 38, 2221.

As used herein, the term "step" in an isotherm is defined by a sigmoidal absorption profile, otherwise known as a Type-V isotherm. S. J. Gregg and K. S. W. Sing, *Adsorption, Surface Area and Porosity*, 2$^{nd}$ Ed. Academic Press Inc., New York, NY, 1982, Ch V. The step can be generally defined by a positive second derivative in the isotherm, followed by an inflection point and a subsequent negative second derivative in the isotherm. The step occurs when adsorbent binding sites become accessible only at certain gas partial pressures, such as when $CO_2$ inserts into a metal-amine bond, or alternatively, when a dynamic framework pore is opened.

The term "salt(s)" includes salts of the compounds prepared by the neutralization of acids or bases, depending on the particular ligands or substituents found on the compounds described herein. When compounds of the present invention contain relatively acidic functionalities, base addition salts can be obtained by contacting the neutral form of such compounds with a sufficient amount of the desired base, either neat or in a suitable inert solvent. Examples of base addition salts include sodium, potassium, calcium, ammonium, organic amino, or magnesium salt, or a similar salt. Examples of acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids, and the like, as well as the salts derived from relatively nontoxic organic acids like acetic, propionic, isobutyric, butyric, maleic, malic, malonic, benzoic, succinic, suberic, fumaric, lactic, mandelic, phthalic, benzenesulfonic, p-tolylsulfonic, citric, tartaric, methanesulfonic, and the like. Certain specific compounds of the present disclosure contain both basic and acidic functionalities that allow the compounds to be converted into either base or acid addition salts. Hydrates of the salts are also included.

The Metal-Organic Framework

A metal-organic framework has a plurality of one or more distinct metallic elements and a plurality of linkers wherein each of the plurality of one or more distinct metallic elements (metal ions) are bridged by one or more of the plurality of linkers. In certain instances, this forms open metal sites. In an aspect, the plurality of one or more distinct metallic elements comprise magnesium, zinc, nickel, copper, and/or a combination thereof. As described herein, the metal-organic framework can comprise one or more distinct elements independently selected from the group of Mg, Ca, V, Mn, Cr, Fe, Co, Ni, Cu and Zn. In an aspect, the distinct metallic element is Mg.

The metal-organic framework can be of general structural Formula I

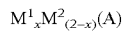

wherein $M^1$ is a metal or salt thereof, and $M^2$ is a metal or salt thereof, $M^1$ can be the same as $M^2$ and X is 1, or $M^1$ is not $M^2$ and X is a value from 0.01 to 1.99. A is an organic linker.

Suitable linkers (also referred to herein as "organic linkers") can be determined from the structure of the metal-organic framework and the symmetry operations that relate the portions of the organic linker that bind to the metal node of the metal-organic framework. A linker which is chemically or structurally different, yet allows the metal node-binding regions to be related by a $C_2$ axis of symmetry, will form a metal-organic framework of an identical topology. In an aspect, the organic linker can be formed by two phenyl rings joined at carbon 1,1', with carboxylic acids on carbons 3, 3', and alcohols on carbons 4,4'. Switching the position of the carboxylic acids and the alcohols (e.g., "pc-$H_4$DOBPDC" or "pc-MOF-274" described below) does not change the topology of the metal-organic framework.

Also, the linker can be a multidentate organic ligand comprising a first binding site and a second binding site that are bridged together with a third binding site. In an aspect, the first binding site and second binding site of the multidentate organic ligand each comprise a salicylate moiety and the third binding site comprises a diamine moiety. In an aspect, the multidentate organic linker is 5, 5'-(((1E,2E)-ethane-1,2-diylidene)bis-(azaneylylidene))bis(2-hydrozybenzoic acid).

The Metal-Organic Framework System

As described herein, a metal-organic framework system comprises a ligand appended to the metal-organic framework. Generally, metal-organic framework systems can be of the general structural Formula II

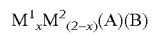

wherein $M^1$ is independently selected from Mg, Ca, V, Mn, Cr, Fe, Co, Ni, Cu and Zn; $M^2$ is independently selected from Mg, Ca, V, Mn, Cr, Fe, Co, Ni, Cu and Zn, and $M^1$ can be the same as $M^2$ and X is 1, or $M^1$ is not $M^2$ and X is a value from 0.01 to 1.99. A is the organic linker, and B is the ligand. Generally, the number of ligands (B) will be equivalent to the number of metal sites. However, for polyamines, such as described in Example 5, the number of ligands can be less than 2 and ideally at a ratio of one ligand to two metals.

As described herein, the ligand can be an amine or alcohol. More specifically, the amine can be a diamine, cyclic diamine, triamine, and/or tetramine. Furthermore, the metal organic framework system can display a Type-V step $CO_2$ isotherm profile upon exposure to carbon dioxide. As described in U.S. Pat. App. No. 62/839,261, it is possible to adjust the Type-V step through metal selection and/or ratio of metals incorporated into the metal-organic framework system. In an aspect, the metal-organic framework system comprises a diamine appended to the metal organic framework.

Further provided are adsorbents comprising one or more of the metal-organic framework systems described herein. The present adsorbents can be used in methods of removing carbon dioxide from various types of gas streams.

Traditional Synthesis of Making Metal-Organic Frameworks

Traditional synthesis for making metal-organic frameworks involve complete dissolution of solids in solvent forming a reaction solution that then enhances metal-organic framework growth at elevated temperatures. Often the prerequisite of such synthesis is a large volume of solvent required for reagent dissolution. For crystal growth, however, the amount of the solid reagents needed to make the metal-organic framework is often the limiting factor.

As referred to herein, the traditional synthesis is typically applied reactions carried out by conventional electric heating without any parallel reactions. In the traditional synthesis, reaction temperature is a primary parameter of a synthesis of the metal-organic framework and two temperature ranges, solvothermal and nonsolvothermal, are normally distinguished, which dictate the kind of reaction setups to be used. Solvothermal reactions generally take place in closed vessels under autogenous pressure about the boiling point of the solvent used. Nonsolvothermal reactions take place below, or at the boiling point under ambient pressure, simplifying synthetic requirements. Nonsolvothermal reactions can be further classified as room-temperature or elevated temperatures.

Traditional synthesis of metal-organic frameworks takes place in a solvent and at temperatures ranging from room temperature to approximately 250° C. Heat is transferred from a hot source, the oven, through convection. Alternatively, energy can be introduced through an electric potential, electromagnetic radiation, mechanical waves (ultrasound), or mechanically. The energy source is closely related to the duration, pressure, and energy per molecule that is introduced into a system, and each of these parameters can have a strong influence on the metal-organic framework formed and its morphology.

Traditional synthesis of metal-organic frameworks is described in McDonald, T., Mason, J., Kong, X. et al, Cooperative insertion of $CO_2$ in diamine-appended metal-organic frameworks, Nature 519, 303-08 (2015), which is incorporated herein by reference. Generally, 0.10 mmol of a linker, 0.25 mmol of metal salts, and 10 mL of a solvent, i.e., methanol/dimethylformamide ("DMF") are combined together in a 20 mL glass scintillation vial. The vial is then sealed and placed in a well plate two (2) cm deep on a 393° K hot plate for about 12 hours, after which a powder forms on the bottom and walls of the vial. The metal-organic framework material is then decanted and the remaining powder soaked three times in DMF and then three times in methanol. The metal-organic frameworks are then collected by filtration and fully desolvated by heating under dynamic vacuum (<10 μbar) at 523° K for 24 hours. Using this specific methodology, the traditional synthesis method yields about 0.073 mmol of metal-organic frameworks, or 73% yield (comparing mmol of the metal-organic frameworks produced to initial mmol of linker) or a volume-normalized mass-based yield of 2.7 grams metal-organic framework per liter of reaction solution.

In addition to the traditional synthesis described in Nature, 2015, 519, 303-308, incorporated herein by reference, synthesis of making metal-organic frameworks are further described in: J. Am. Chem. Soc. 2012, 134, 7056-7065; Chem. Sci, 2018, 9, 160-174; U.S. Pat. No. 8,653,292 and US Patent Appl. Pub. Nos. 2007/0202038, 2010/0307336, and 2016/0031920.

In an aspect, ligands can contain other structural elements used to coordinate the ligand to one or more metals of the framework system, including but not limited to, the following functional groups: carboxylate, triazolate, pyrazolate, tetrazolate, pyridines, amines, alkoxide and/or sulfate group.

By way of example, the amine-appended metal-organic framework systems can be prepared in a two-step process shown in scheme 1 as follows:

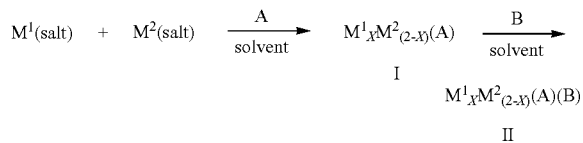

In step 1, a suitable salt of $M^1$ and a suitable salt of $M^2$ are combined with a linker A in an appropriate solvent and heated to provide the metal-organic framework system generally represented by Formula I. For example, $MnCl_2$ and $Mg(NO_3)_2 \cdot 6H_2O$ are combined with 4,4'-dioxido-3,3'-biphenyldicarboxylate ($H_4$DOBPDC) in methanol and N,N'-dimethylformamide (DMF) to provide a composition of Formula I where $M^1$ is Mn, $M^2$ is Mg and A is DOBPDC.

In step 2, the metal-organic framework of Formula I is combined with a ligand (B) in a suitable solvent. For example, $M^1$ is Mn, $M^2$ is Mg and A is DOBPDC, is combined with 2-ampd in toluene to provide the mixed-metal mixed-organic framework system of Formula II, where $M^1$ is Mn, $M^2$ is Mg, A is DOBPDC and B is 2-ampd. The number of amines will be equivalent to the number of metals.

Before the novel present methods and compositions are disclosed and described, it is to be understood that unless otherwise indicated this invention is not limited to specific compounds, components, compositions, reactants, reaction conditions, ligands, catalyst structures, metallocene structures, or the like, as such may vary, unless otherwise specified. It is also to be understood that the terminology used herein is for the purpose of describing particular embodiments only and is not intended to be limiting.

Vapor-Phase Appending of Ligands to the Metal-Organic Framework

As described herein, current methods of making metal-organic framework systems are affected by evaporation of solvents used to make the system. By utilizing higher boiling or more polar solvents, solvent evaporation can be reduced, but crystallinity of the materials can also be reduced. Therefore, we have developed a new synthesis of making a metal-organic framework system, where a ligand in the vapor-phase is contacted with the metal-organic framework, binds to the metal-organic framework, and provides the metal-organic framework system. With this new methodology, crystallinity is preserved and in certain instances, improvements are observed in signal intensity and peak width of the metal-organic framework system which is indicative of higher order and enhanced crystallinity. Indeed, adsorption isotherms of low crystallinity metal-organic framework systems do not display the desired adsorption step, demonstrating the advantage of this vapor-phase approach.

Further, cycling amine-appended metal-organic framework systems can result in progressive amine loss over time, deactivating the material for the desired separation. In certain systems, contacting the metal-organic framework with steam to desorb bound $CO_2$ accelerates amine loss. More particularly, some metal-organic frameworks in the MOF-274 family display limited stability and undergo decomposition upon exposure to solvent, preventing successful amine appending and subsequent use for $CO_2$ capture. These specific problems are solved by contacting the metal-organic framework with amine in the gas phase. The amine is heated above the boiling point and passed over the metal-organic framework, subsequently appending to the metal sites and generating the desired adsorbent. The metal-organic framework can be re-functionalized with amine by replicating the original loading protocol, though such an approach would require complete removal of the adsorbent from a process unit, incurring expense and downtime. Alternatively, an adsorbent bed could be flooded with amine dissolved in organic solvent, however the use of large quantities of organic solvent is required, creating a safety hazard, unnecessary hazardous waste stream, and incurring additional expense.

As described in the Examples below, the novel methods of synthesizing a metal-organic framework system comprise the steps of: (a) providing a metal-organic framework comprising at least one open metal site; and (b) appending (binding) a ligand in a vapor-phase to the metal-organic framework at the open metal site to form the metal-organic framework system.

In an aspect, the present methods of making a metal-organic framework system comprising the steps of: (a) making a metal-organic framework; (b) evaporating a plurality of ligands to produce a vapor-phase; and (c) in the vapor-phase, binding the at least one of the plurality of ligands to the at least one of the open metal sites of the metal-organic framework to form the metal-organic framework system. The metal-organic framework comprises a plurality of open metal sites wherein a linker bridges at least one of the plurality of the open metal sites to another. This methodology can further comprise the step of suspending the metal-organic framework in a solvent. In an aspect, the method can further comprise the step of filtering the solvent from the metal-organic framework. In an aspect, the method can further comprise the plurality of ligands is heated to form the vapor-phase. In an aspect, the method can further comprise the plurality of ligands forming the vapor-phase under reduced pressure. In an aspect, the method can further comprise an inert gas passes through the vapor-phase.

Innovative new methods of making and regenerating amine-appended metal-organic frameworks, with specific application in selective $CO_2$ capture. Removal of solvent from the process also facilitates preparation of a novel composition of matter, namely various amine-appended forms of the MOF-274 metal-organic framework, which cannot be prepared via traditional solution-phase amine appending efforts. Importantly, as described in the Examples, for the materials prepared by the vapor-phase appending approach, the desirable Type-V $CO_2$ isotherms are preserved.

Hence, vapor-phase appending of ligands, particularly amines, can produce novel metal-organic framework systems that were previously unstable. The novel metal-organic framework system comprises a metal-organic framework having magnesium and/or cobalt ions linked together with ethynediiminebissalicylic acid to form the plurality of open metal sites and the plurality of open metal sites are appended in the vapor-phase to provide the metal-organic framework system. More specifically, the novel metal-organic framework systems comprise the MOF-274 metal-organic frameworks. The plurality of open metal sites is then appended with 2-aminomethyl piperidine and/or N,N-dimethylethylenediamine.

Recycling and/or Repurposing Metal-Organic Framework Systems

As previously described, metal-organic framework, MOF-274 can be functionalized with a diamine to form a leading candidate for $CO_2$ capture applications due to affording a desirable Type-V isotherm. Installation of different diamines changes the adsorbent properties, including impartation of steam stability or variation of the $CO_2$ partial pressure/temperature needed to effect $CO_2$ adsorption. This versatility allows the diamine-appended MOF-274 to have potential utility for $CO_2$ capture from a wide range of different streams.

Provided herein are methods of repurposing the metal-organic framework system by (1) stripping a diamine from the MOF-274 metal-organic framework; and (2) loading a different diamine into the metal-organic framework for repurposing the metal-organic framework systems for different streams comprising $CO_2$, referred to herein as "$CO_2$ streams."

As described in the Examples, recycled diamine-appended MOF-274 adsorbents (referred to as "recycled metal-organic framework systems") display the desired type-V isotherms, demonstrating a surprising stability to sequential soaking in coordinating solvents, as many metal-organic frameworks are known to decompose, collapse, or suffer pore blockage under similar conditions. The problem is an inability to recycle diamine appended MOF-274 or repurpose MOF-274 with a different diamine for use in under different $CO_2$ capture conditions. We solved this problem by soaking the diamine loaded MOF-274 in a coordinating solvent, exchanging this solvent with a non-coordinating solvent, and treating the stripped MOF-274 (the metal-organic framework devoid of the original diamine) with a different diamine to afford an entirely different adsorbent material. Conversely, the prior art solution is the synthesis of new MOF-274 material, followed by loading with the desired diamine.

As described in the Examples, the methods of recycling and/or repurposing a metal-organic framework system comprises the step of stripping (detaching, or otherwise removing) at least one or more of the plurality of ligands from the metal-organic framework system. For purposes of recycling metal-organic framework systems, useful solvents include water, methanol, ethanol, or a combination thereof. Solvent can be matched with the ligand to ensure complete removal, while simultaneously providing multiple options for process flexibility and optimization. To remove the ligand, the metal-organic framework system is soaked in solvent for at least between about 10 min to about 18 hr.

Appending or re-appending the ligand to the metal-organic framework can be performed in solution (liquid) or using the novel vapor-phase methods described herein. As taught in the Examples below, the metal-organic framework can be appended with different or the same plurality of ligands.

For example, installation of different diamines onto a metal-organic framework system changes the adsorbent properties, including impartation of steam stability or variation of the $CO_2$ partial pressure and temperature needed to affect $CO_2$ adsorption. This versatility allows metal-organic framework systems to have potential utility for $CO_2$ capture from a wide range of different streams. Nevertheless, as noted herein, once the metal-organic framework system is appended with a selected amine, the current paradigm is that the metal-organic framework system remains in that particular form throughout the duration of its use. Little attention has been given to the recycle of spent metal-organic framework systems, or the intentional stripping of the ligands from a metal-organic framework system for the purposes of loading a different ligand and achieving different performance. Moreover, as new advantaged amine-appended metal-organic framework systems are discovered, the ability to upgrade an adsorbent system through installation of new diamines, eliminating de novo metal-organic framework synthesis, will minimize expense, waste, and adsorbent downtime.

Recycling/repurposing the metal-organic framework system can provide pronounced benefits if implemented at scale and can facilitate subsequent recovery and recycle of the ligand through a variety of separation approaches, such as distillation, adsorption beds, or membranes.

Synthesized, Recycled or Repurposed Metal-Organic Frameworks

As described above, the metal-organic frameworks synthesized or recycled/repurposed with the present novel methods can include variations and different aspects. For example, in an aspect, the present methods can provide metal-organic frameworks and metal-organic framework systems that have linkers of the general formula:

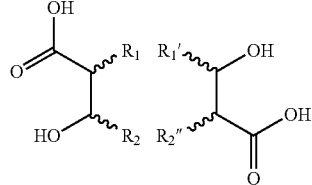

where $R_1$ is connected to $R_1'$ and $R_2$ is connected to $R_2.''$

Examples of such linkers include:

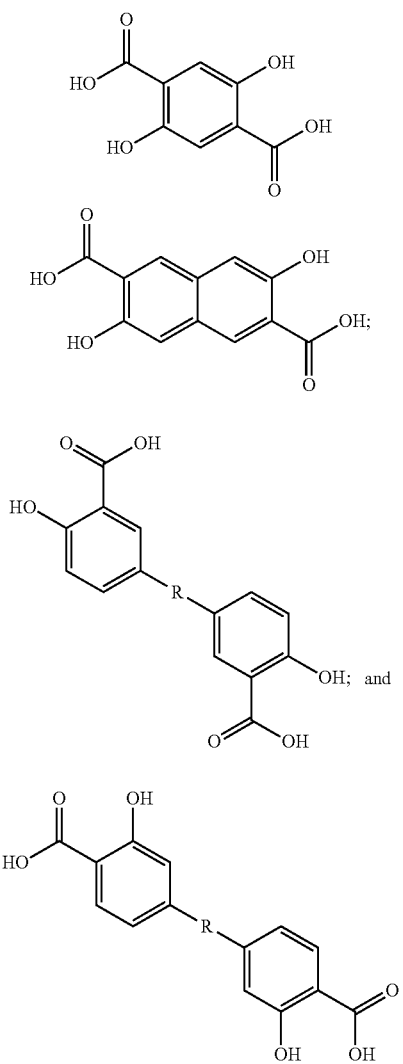

where R is any molecular fragment.

Examples of suitable organic linkers include 4,4'-dioxidobiphenyl-3,3'-dicarboxylate ($H_4$DOBPDC); 4,4''-dioxido-[1,1':4',1''-terphenyl]-3,3''-dicarboxylate ($H_4$DOTPDC); and 3,3'-dioxidobiphenyl-4,4'-dicarboxylate (para-carboxylate-$H_4$DOBPDC also referred to as PC-DOBPDC) as well as the following compounds:

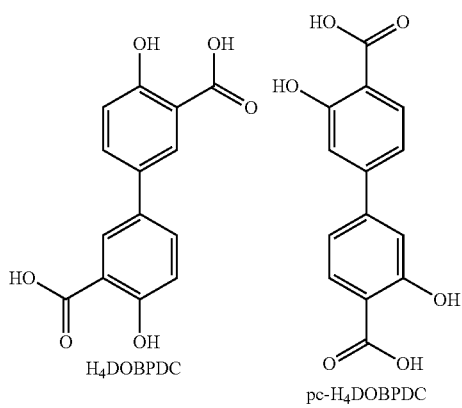

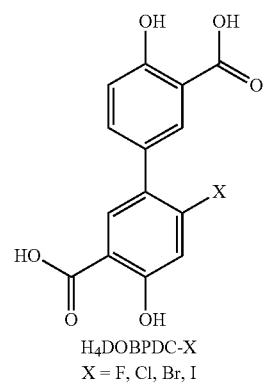

In an aspect, the linker has the formula:

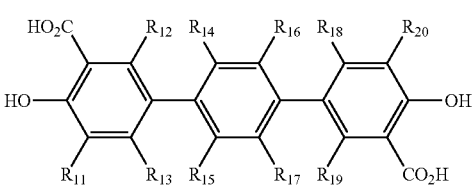

where $R_{11}$, $R_{12}$, $R_{13}$, $R_{14}$, $R_{15}$, $R_{16}$, $R_{17}$, $R_{18}$, $R_{19}$, and $R_{20}$ are each independently selected from H, halogen, hydroxyl, methyl, and halogen substituted methyl.

In an aspect, the linker has the formula:

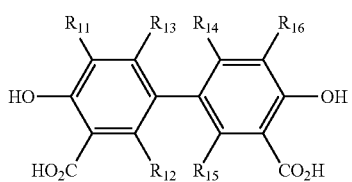

where, $R_{11}$, $R_{12}$, $R_{13}$, $R_{14}$, $R_{15}$, and $R_{16}$ are each independently selected from H, halogen, hydroxyl, methyl, and halogen substituted methyl.

In an aspect, the linker has the formula:

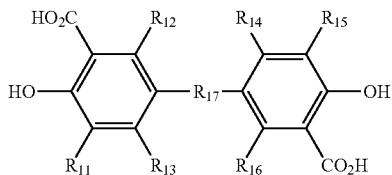

where $R_{11}$, $R_{12}$, $R_{13}$, $R_{14}$, $R_{15}$, and $R_{16}$ are each independently selected from H, halogen, hydroxyl, methyl, or halogen substituted methyl, and $R_{17}$ is selected from substituted or unsubstituted aryl, vinyl, alkynyl, and substituted or unsubstituted heteroaryl.

In an aspect, the linker can have the formula:

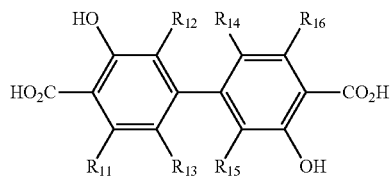

where $R_{11}$, $R_{12}$, $R_{13}$, $R_{14}$, $R_{15}$, and $R_{16}$ are each independently selected from H, halogen, hydroxyl, methyl, or halogen substituted methyl, and $R_{17}$ is selected from substituted or unsubstituted aryl, vinyl, alkynyl, and substituted or unsubstituted heteroaryl.

In an aspect, the organic linker includes multiple bridged aryl species such as molecules having two (or more) phenyl rings or two phenyl rings joined by a vinyl or alkynyl.

Synthesized, Recycled or Repurposed Metal-Organic Framework Systems

As provided herein, a ligand can contain one or more groups capable of functioning as suitable a Lewis base (electron donors) such as oxygen, phosphorous or sulfur or an amine having 1 to 10 amine groups. The present methods can provide metal-organic framework systems that can have various types of ligand appended to the metal-organic framework. In an aspect, B is a ligand selected from the group consisting of:

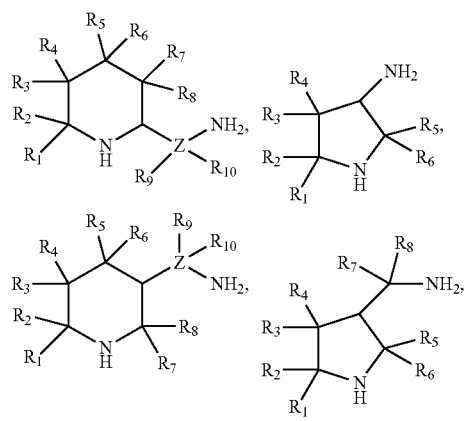

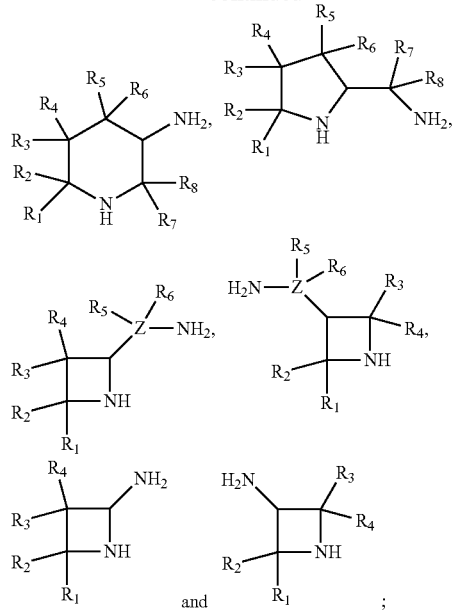

wherein Z is carbon, silicon, germanium, sulfur, or selenium, and $R_1$, $R_2$, $R_3$, $R_4$, $R_5$, $R_6$, $R_7$, $R_8$, $R_9$, and $R_{10}$ are each independently selected from H, halogen, methyl, halogen substituted methyl, and hydroxyl. In an aspect, $R_1$, $R_2$, $R_3$, $R_4$, $R_5$, $R_6$, $R_7$, $R_8$, $R_9$, and $R_{10}$ R1, R2, R3, R4, R5, R6, R7, R8, R9, and R10 are each H and Z is carbon.

Ligands suitable for methods of making the present metal-organic framework systems can have (at least) two functional groups: 1) a functional group used to bind $CO_2$; and 2) a functional group used to bind the metal. The second functional group that binds the metal can also be an amine. It is possible to use other functional groups such as oxygen containing groups like alcohols, ethers or alkoxides, carbon groups like carbenes or unsaturated bonds like alkenes or alkynes, or sulfur atoms.

The metal-organic framework systems described herein are useful as adsorbents (adsorption materials) for a variety of gas separation including the isolation of individual gases from a stream of combined gases, such as carbon dioxide/nitrogen, carbon dioxide/hydrogen, carbon dioxide/methane, carbon dioxide/oxygen, carbon monoxide/nitrogen, carbon monoxide/methane, carbon monoxide/hydrogen, hydrogen sulfide/methane and hydrogen sulfide/nitrogen.

Among the primary benefits of physiorption onto solid materials is the low regeneration energy compared to that required for aqueous amines. However, this benefit frequently comes at the expense of low capacity and poor selectivity. The present metal-organic framework systems provide adsorbents (adsorbent materials) that can bridge the two approaches through the incorporation of sites that bind $CO_2$ by chemisorption onto solid materials. These materials can eliminate the need for aqueous solvents, and can have significantly lower regeneration costs compared with traditional amine scrubbers, yet maintain their exceptional selectivity and high capacity for $CO_2$ at low pressures.

All numerical values within the detailed description and the claims herein are modified by "about" or "approximately" the indicated value, taking into account experimental error and variations.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

The features of the invention are described in the following non-limiting examples.

Example 1

Vapor-Phase Appending of a Metal-Organic Framework

A metal-organic framework system was made by first making the metal-organic framework system by the traditional methods described herein and, subsequently appending the plurality of amine ligands to the metal-organic framework in a vapor-phase. Specifically, a mixed metal variant of the metal-organic framework previously described in U.S. Patent Application Publication 2022/0176343 was made and suspended in toluene and transferred to the top of a side-arm filter funnel with a ground glass frit. An empty round-bottom flask was attached to the funnel, and vacuum filtration was used to transfer the solvent to the empty round-bottom flask, creating a uniform wetcake of metal-organic framework on the glass frit. The filter was capped with a septum and vented with a needle. Discarded solvent was replaced with 2.5molar equivalents of N,N' -dimethylethylenediamine, or mmen relative to the quantity of metal-organic framework. The round-bottom flask was then heated above the amine boiling point at 120° C. while nitrogen was passed through the wetcake (the metal-organic framework). Heating continued until the plurality of amine ligands were evaporated to produce an absorbent material capable of capturing carbon dioxide.

Example 2

Characterization of the Adsorbent Material of Example 1

As described above, the absorbent material of Example 1 comprises a metal-organic framework system capable of capturing carbon dioxide was synthesized. This metal-organic framework system included a 1-dimensional hexagonal metal-organic framework comprising ethynediiminebissalicylic acid ("EDBSA") linkers and open metal sites. Through the incorporation of di-amine appended ligands and tetra-amine appended ligands, a steep adsorption of carbon dioxide resulted in a step-wise manner.

Figure 1B:
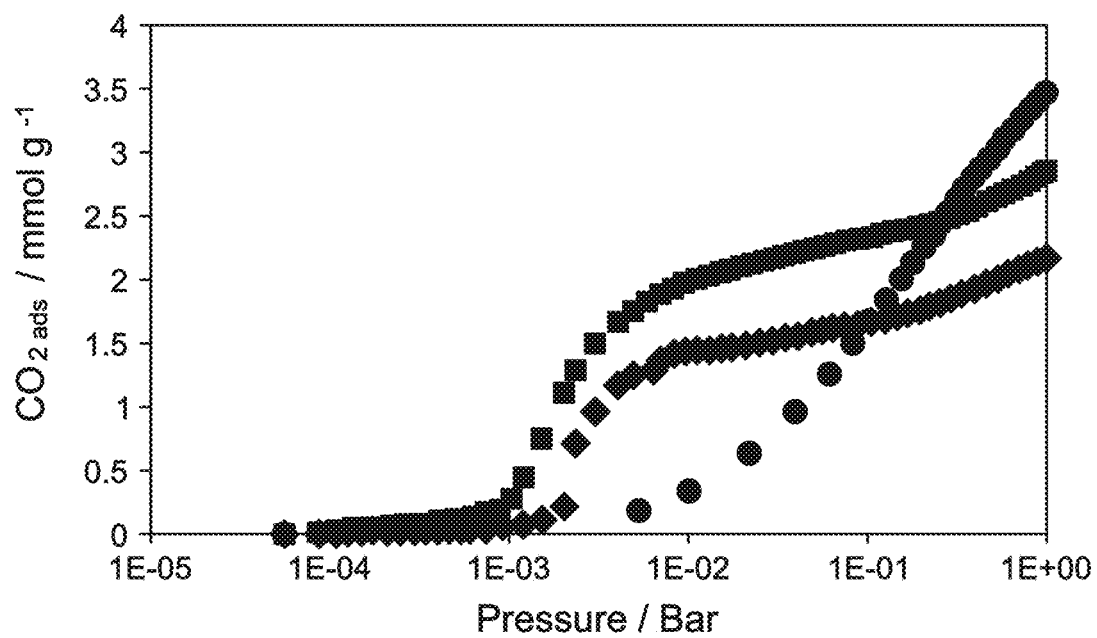

FIGS. 1A and 1B show the effect of saturating amines on the metal-organic framework The metal-organic framework showed a typical type 1 adsorption isotherm. The amine appended metal-organic framework (the metal-organic framework system) showed a strong type 5 isotherm. FIGS. 1A and 1B are the isotherms at 50° C. of the metal-organic framework, the metal-organic framework system where the metal-organic framework was appended with N,N-dimethylethylenediamine ligand, and the metal-organic framework system where the metal-organic framework was appended with 2-aminomethylpiperidine (2-ampd). In FIG. 1A, the isotherms are presented on a linear pressures scale. In FIG. 1B, the isotherms are presented on a logarithmic pressure scale.

Figure 2:
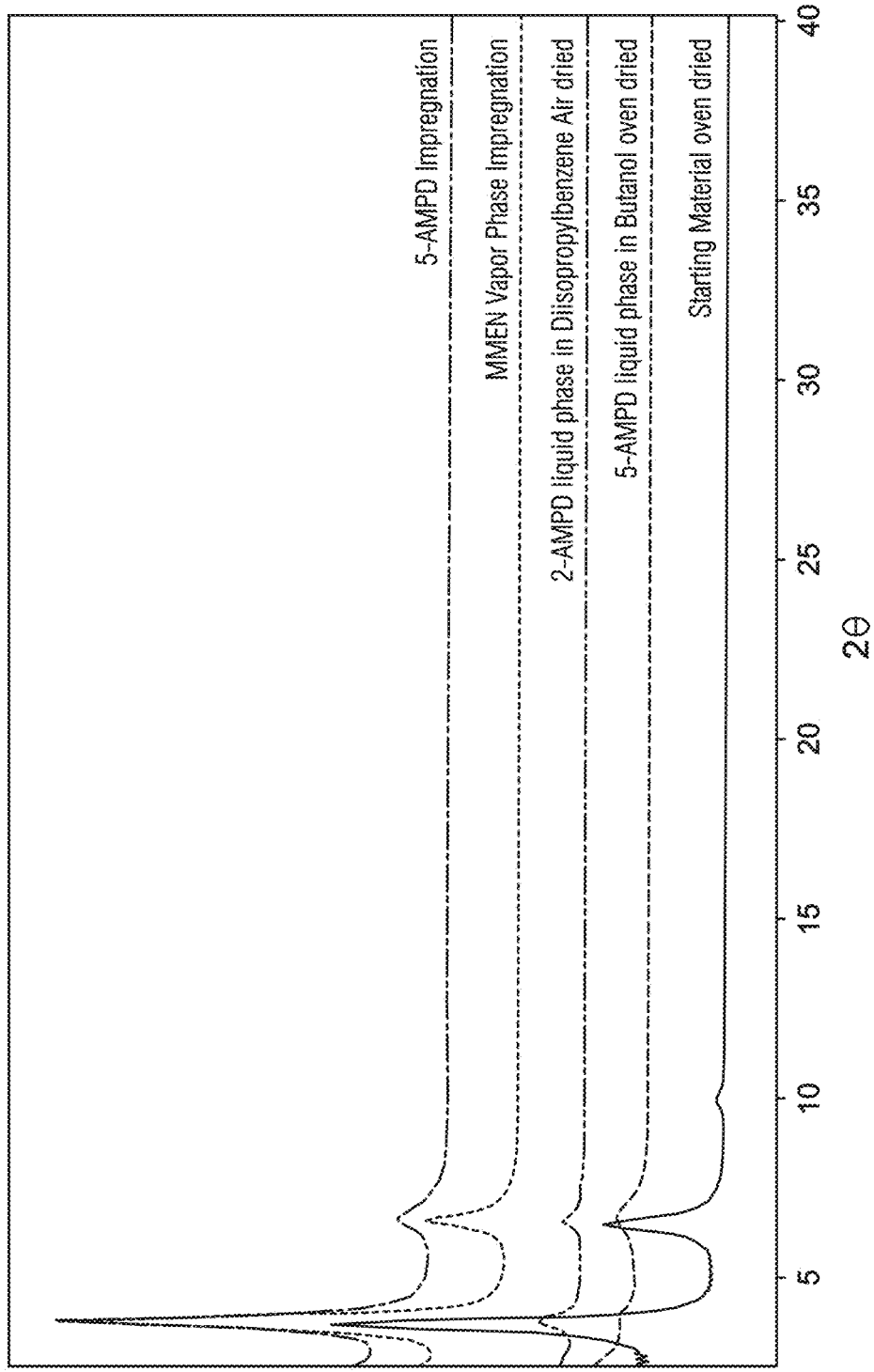
FIG. 2 is powder X-ray diffraction ("PXRD") patterns of the metal-organic framework of Example 1 (pristine) as well as the metal-organic framework systems after amine impregnation in solvent or in vapor of the metal-organic framework of Example 1.

Using the present methods, the ligand (an amine ligand) was heated above the boiling point and a carrier gas (such as nitrogen) is used to transport the vapor-phase of ligands to the metal-organic framework. The metal-organic framework was also heated to a significantly high temperature to permit covalent binding with the amine of the ligand yet preventing condensation or solidification of the ligand. Critically, crystallinity is preserved in the resulting metal-organic framework. FIG. 2 shows the powder x-ray diffraction patterns of the samples of the metal-organic framework system of Example 1 which were treated in solvents as well as in a gas phase ("the vapor-phase"). Improvements are observed in signal intensity and peak width for vapor-phase treated samples, indicative of higher order and enhanced crystallinity. Indeed, adsorption isotherms of the materials having low crystallinity no longer displayed the desired adsorption step, demonstrating the advantage of appending the ligand in the vapor-phase.

Example 3

Vapor-Phase Appending of the Metal-Organic Framework, MOF-274

Amine-appending metal-organic framework, MOF-274, provides leading candidates for selective $CO_2$ capture from flue gas. Traditionally, the metal-organic framework system has been formed by dispersing the nascent metal-organic framework, MOF-274, in an amine-containing non-coordinating solvent, followed by repetitive washing. Various ligands comprising amines have been demonstrated, though inclusion of tetraamines, to require an additional post-appending heating to liberate excess amines and generate the desired loading. When successfully functionalized, these amine-appended metal-organic frameworks display unique type-V isotherms for $CO_2$, selectively binding them over nitrogen ($N_2$) or oxygen ($O_2$).

Specifically, the metal-organic framework, MOF-274 described in US Pat. App. Nos. 62/839,261 was suspended in toluene and transferred to the top of a side-arm filter funnel with a ground glass frit. An empty round-bottom flask was attached to the funnel, and vacuum filtration was used to transfer the solvent to the empty round-bottom flask, creating a uniform wetcake of metal-organic framework on the glass frit. The filter was capped with a septum and vented with a needle. Solvent was discarded and replaced with an appropriate quantity of amine. The round-bottom flask was then heated above the amine boiling point while a stream of nitrogen was passed through the side arm of the filter flask and up through the metal-organic framework wetcake from the amine-containing round bottom flask. Heating was continued until all amine was evaporated from the round-bottom flask. The resulting material displayed the desired type-V $CO_2$ isotherm.

Amines used for vapor-phase appending were 2-(aminomethyl)piperidine ("2-ampd") and N,N'-dimethylethylenediamine ("mmen") shown immediately below were used to produce a metal-organic framework system 1 and a metal-organic framework system 2 respectively.

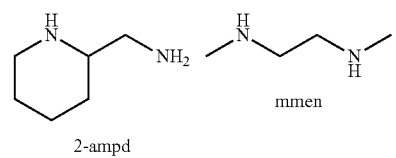

Example 4

Vapor-Phase Appending of Additional Metal-Organic Framework Systems

Figure 3:
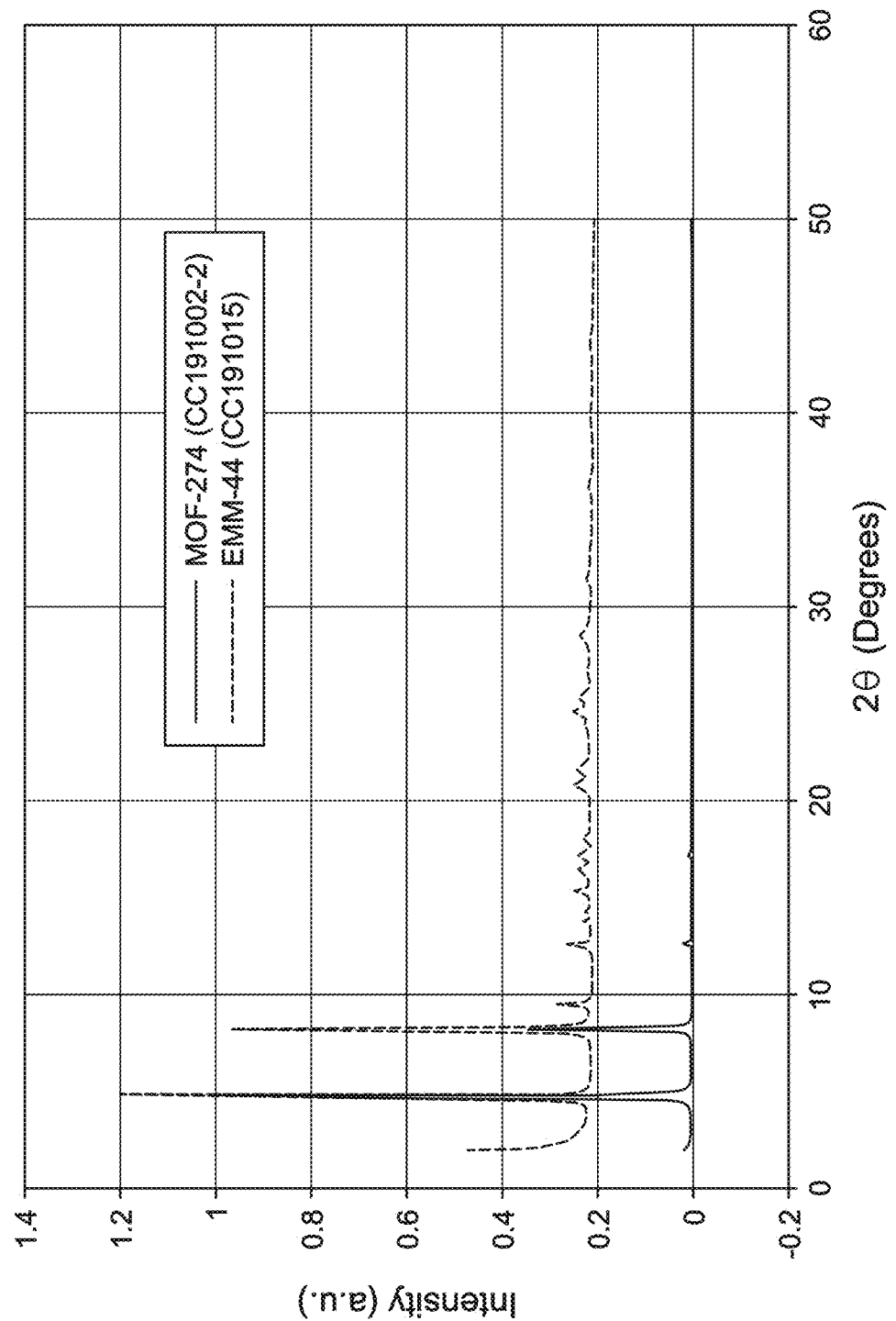
FIG. 3 is PXRD data collected on a metal-organic framework MOF-274 and the metal-organic framework system obtained following vapor-phase amine appending of the metal-organic framework MOF-274, denoted as EMM-44.
Figure 4:
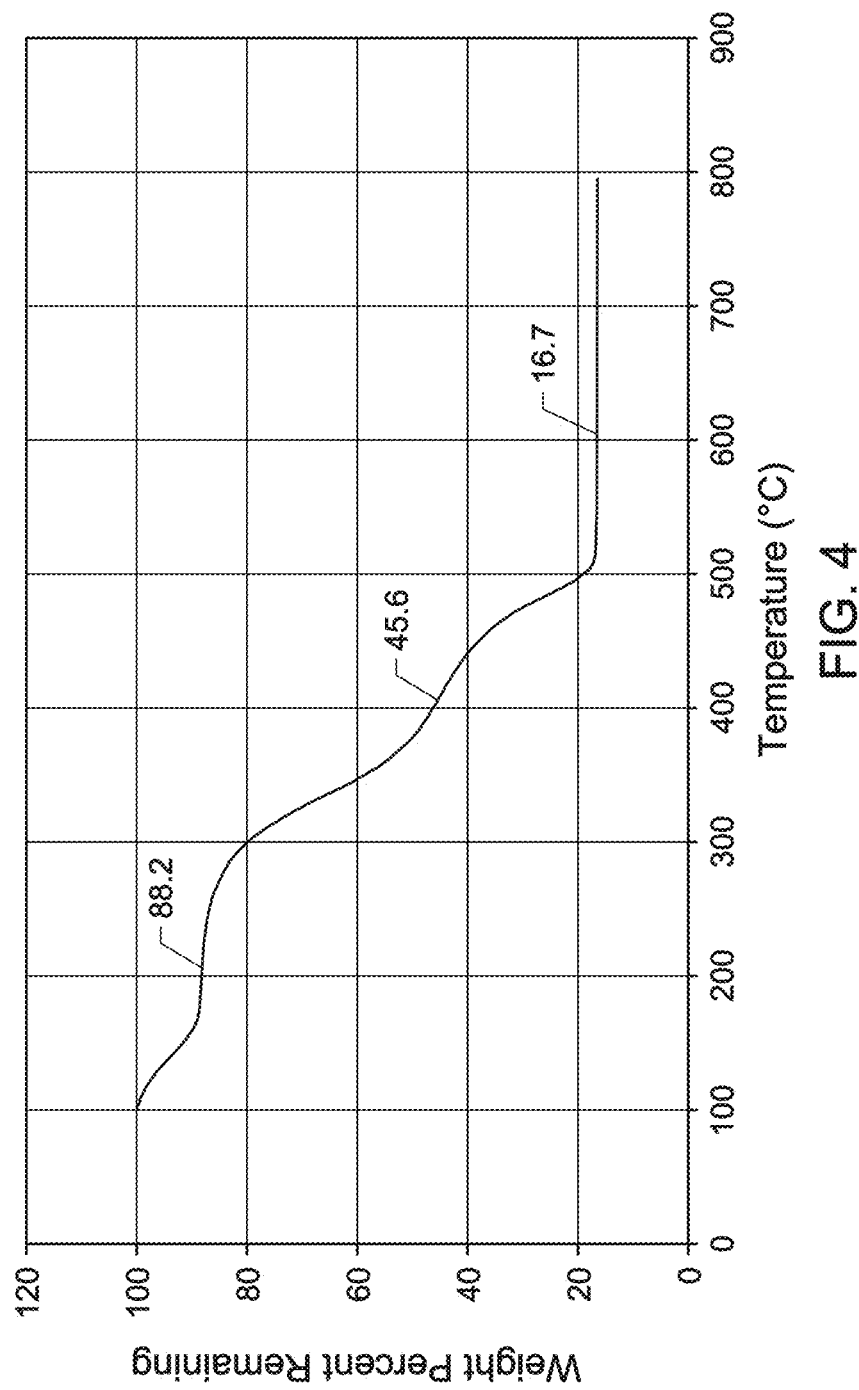
FIG. 4 is a thermogravimetric analysis ("TGA") of the metal-organic framework systems prepared by appending 2-ampd to a 5% manganese, 95% magnesium MOF-274 framework, normalized to 100° C. to account for removal of entrained solvent at lower temperatures.
Figure 5:
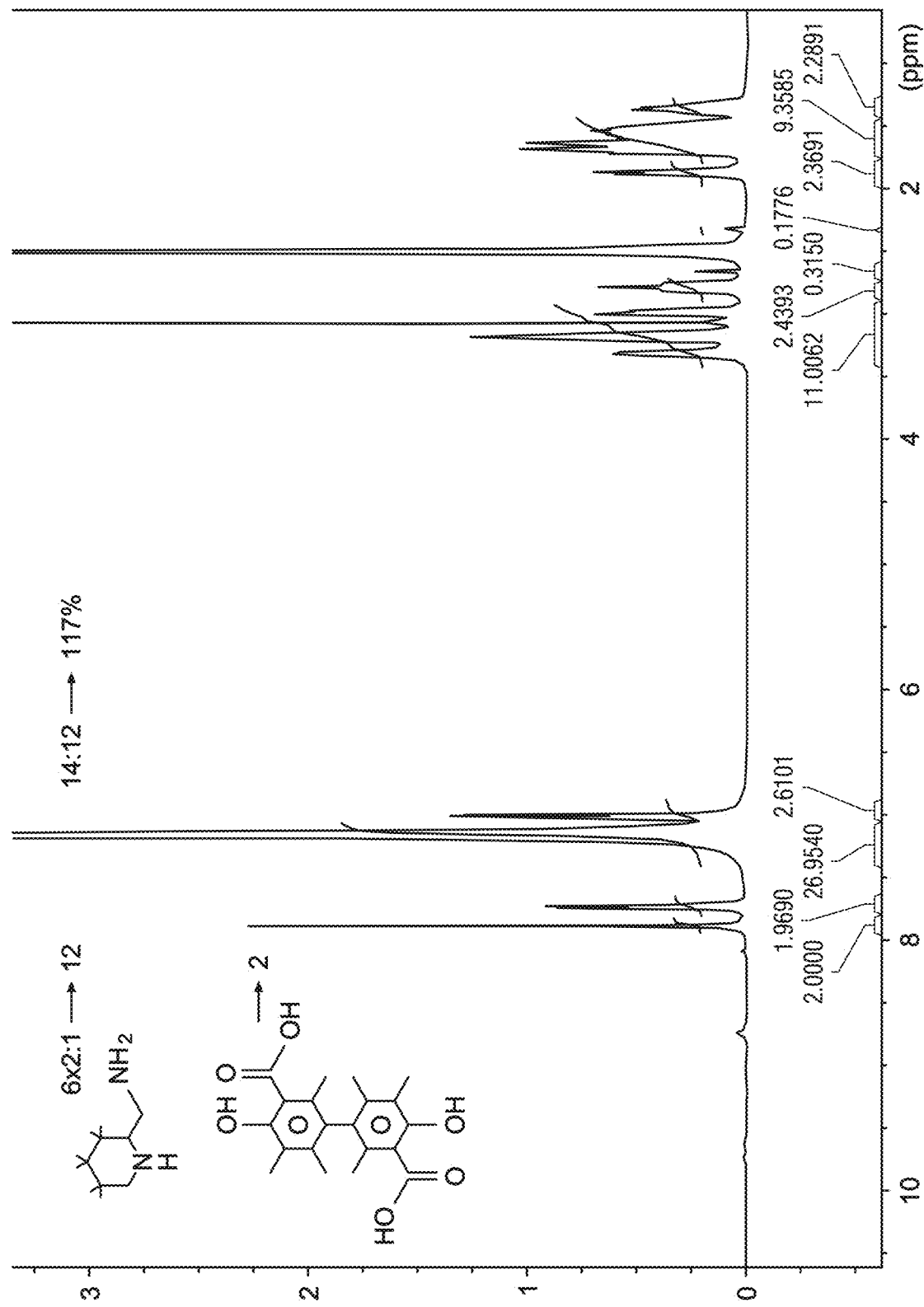
FIG. 5 is a $^1$H NMR spectrum of the metal-organic framework system 1 of Example 3 generated by vapor-phase appending of 2-ampd.
Figure 6:
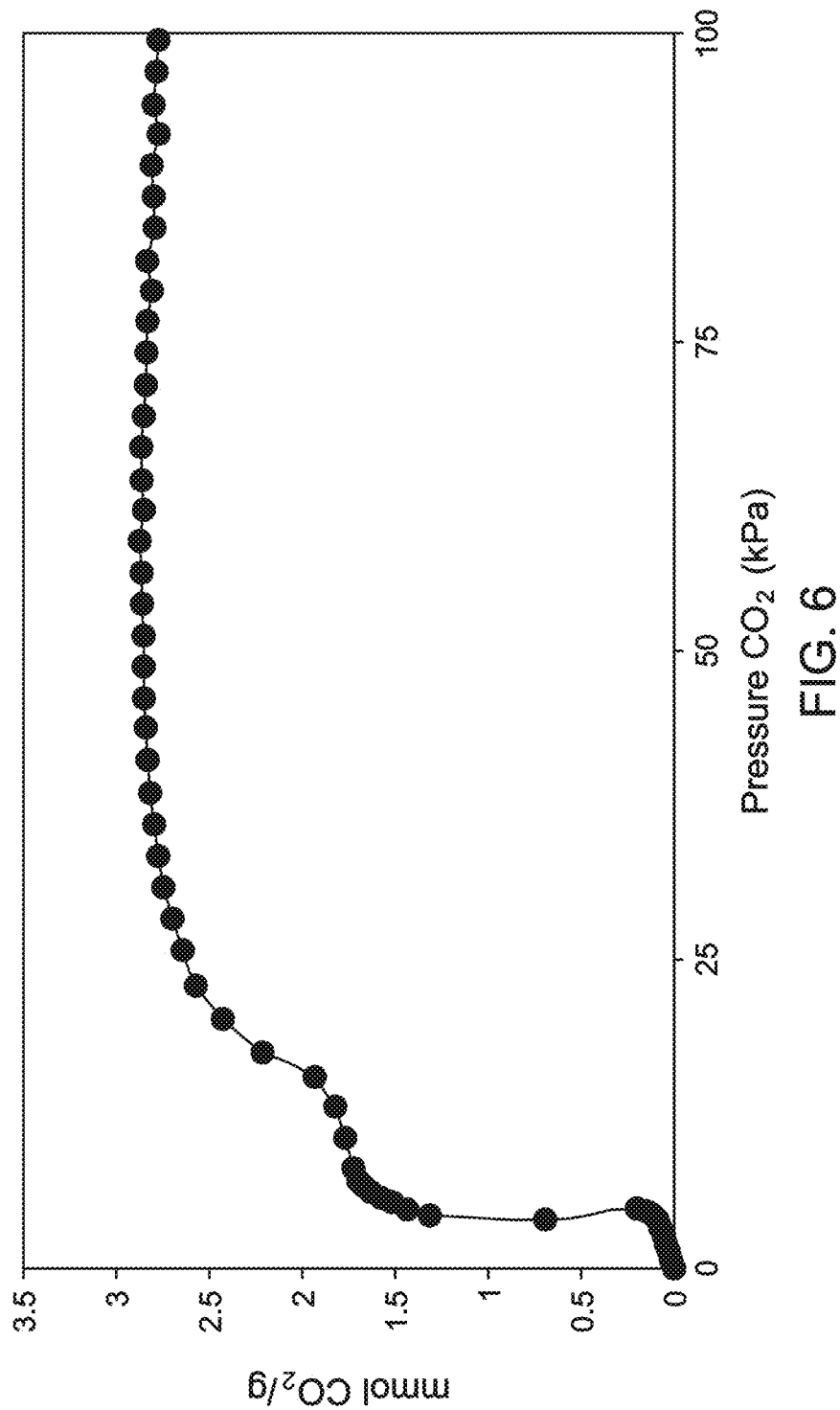
FIG. 6 is a $CO_2$ isotherm for the metal-organic framework system 1 of Example 3.

The metal-organic framework system 1 was prepared by vapor-phase appending of 2-ampd. Following amine appending, powder x-ray diffraction data was collected on the metal-organic framework and the metal-organic framework system and is provided in FIG. 3. As shown, crystallinity of the metal-organic framework was retained following the vapor-phase amine appending of 2-ampd. Further, as shown in FIG. 4, a thermogravimetric analysis of the metal-organic framework system 1 was prepared by appending the ligand (2-ampd) to a 5% manganese MOF-274 metal-organic framework system and normalized to 100° C. to account for removal of entrained solvent at lower temperatures. As shown on the graph of FIG. 4, a 42.6 wt % loss from 250-400° C. is a perfect match with a theoretical weight loss of the metal-organic framework system. Similarly, the 11.8 wt % loss from 100-250° C. was indicative of physisorbed 2-ampd remaining in the metal-organic framework channels after vapor-phase loading. FIG. 5 shows $^1$H NMR of the metal-organic framework system 1. Relative to the integration of a pair of protons on the linker (singlet, 7.95 ppm), the integration of the four most upfield multiplets should sum to 12 for a 100% appended metal-organic framework system. In this instance, the four most upfield multiplets summed to 14, indicating 117% amine loading, which is consistent with the TGA data presented in FIG. 4. As shown in FIG. 6, the metal-organic framework system 1 also displayed the desired type-V isotherm behavior.

Figure 7:
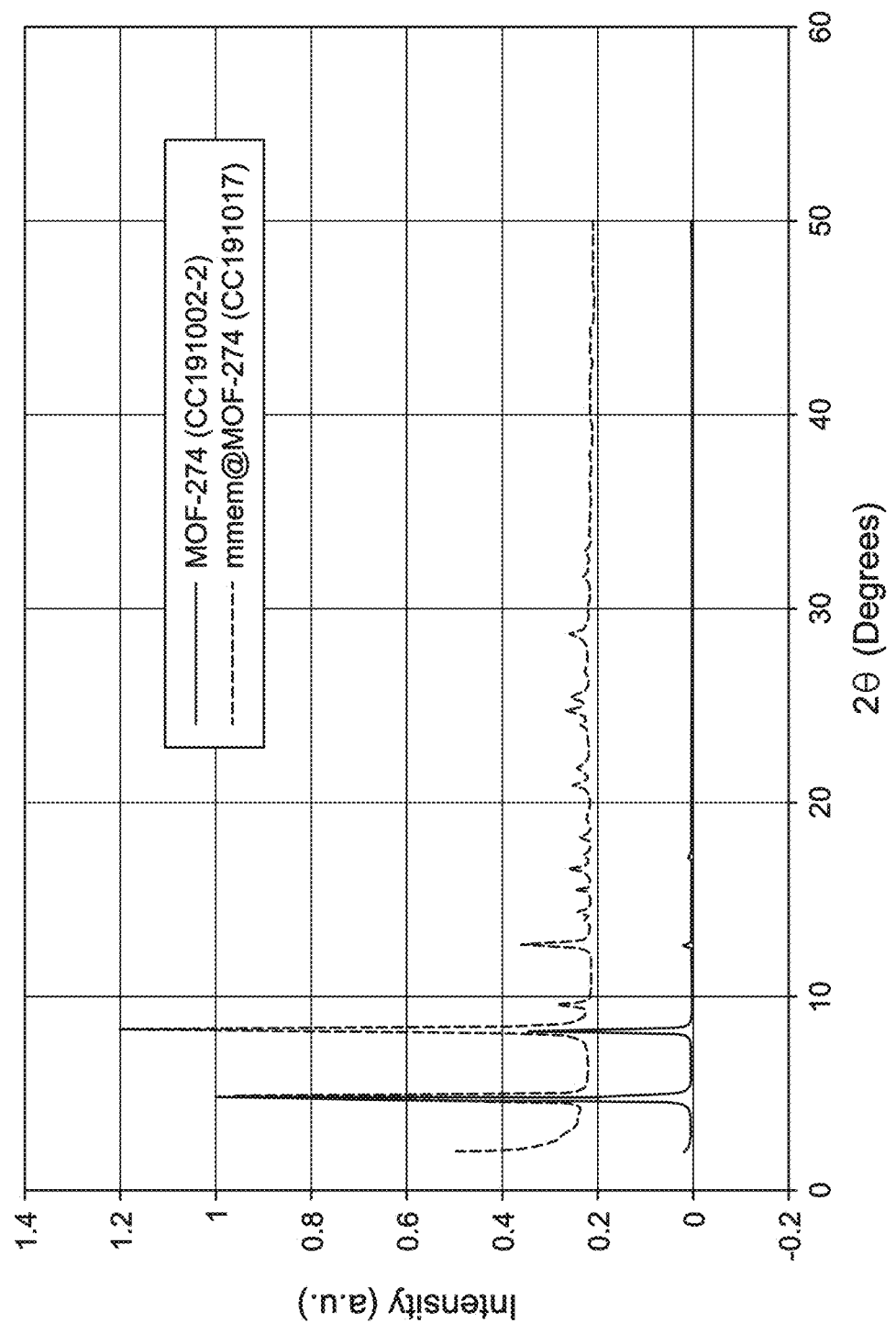
FIG. 7 is PXRD data collected on the metal-organic framework MOF-274 and the metal-organic framework system 2 of Example 3 obtained following vapor-phase amine appending the ligand, mmen.

A metal-organic framework system 2 was prepared by vapor-phase appending of the ligand, mmen to the metal-organic framework (MOF-274). FIG. 7 provides powder x-ray diffraction data collected on the metal-organic framework MOF-274 and the metal-organic framework system 2 obtained following vapor-phase amine appending. The data shows crystallinity was retained following vapor-phase amine appending of the ligand.

Figure 8:
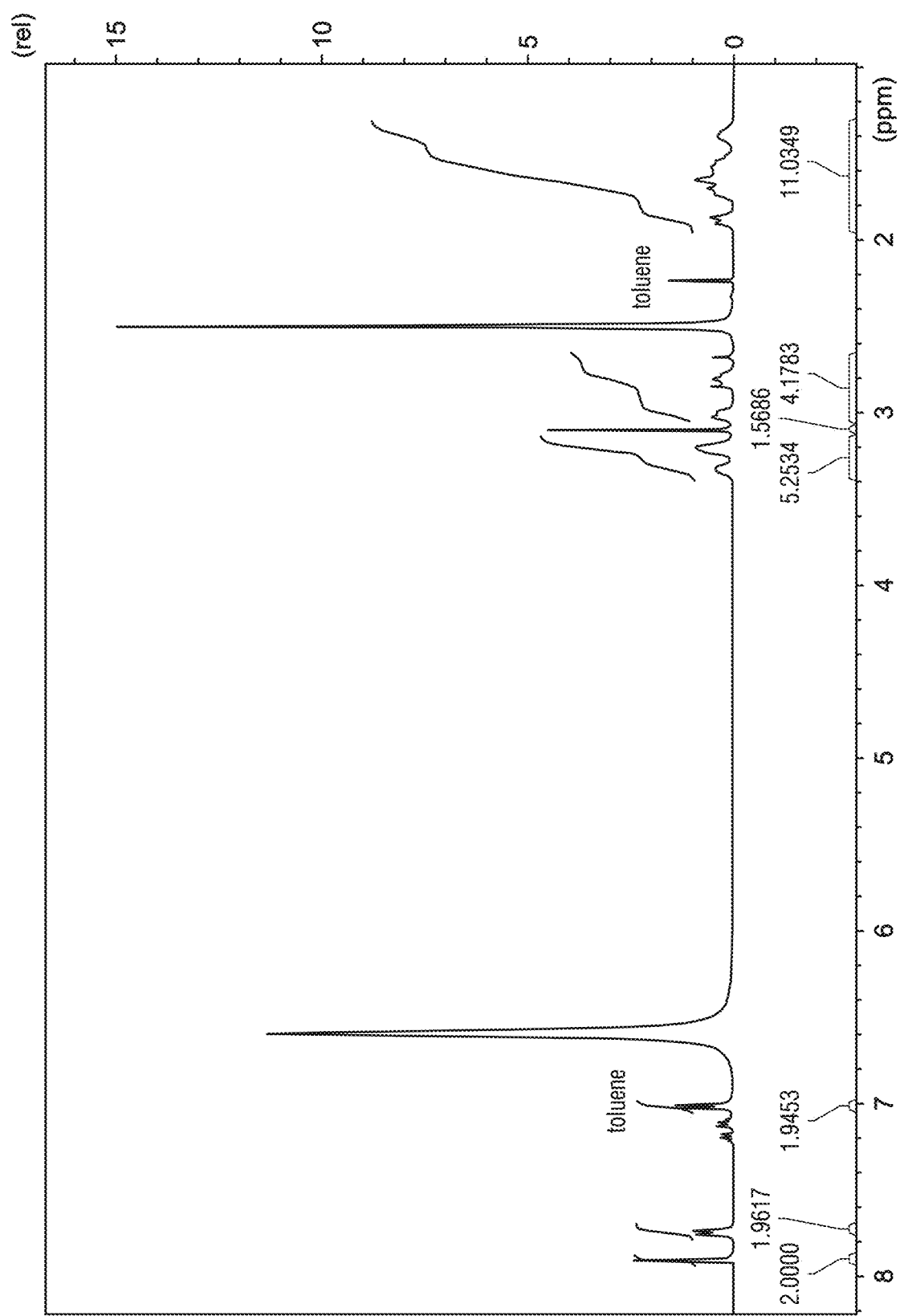
FIG. 8 is a $^1$H NMR spectrum of the metal-organic framework system 2 of Example 3.
Figure 9:
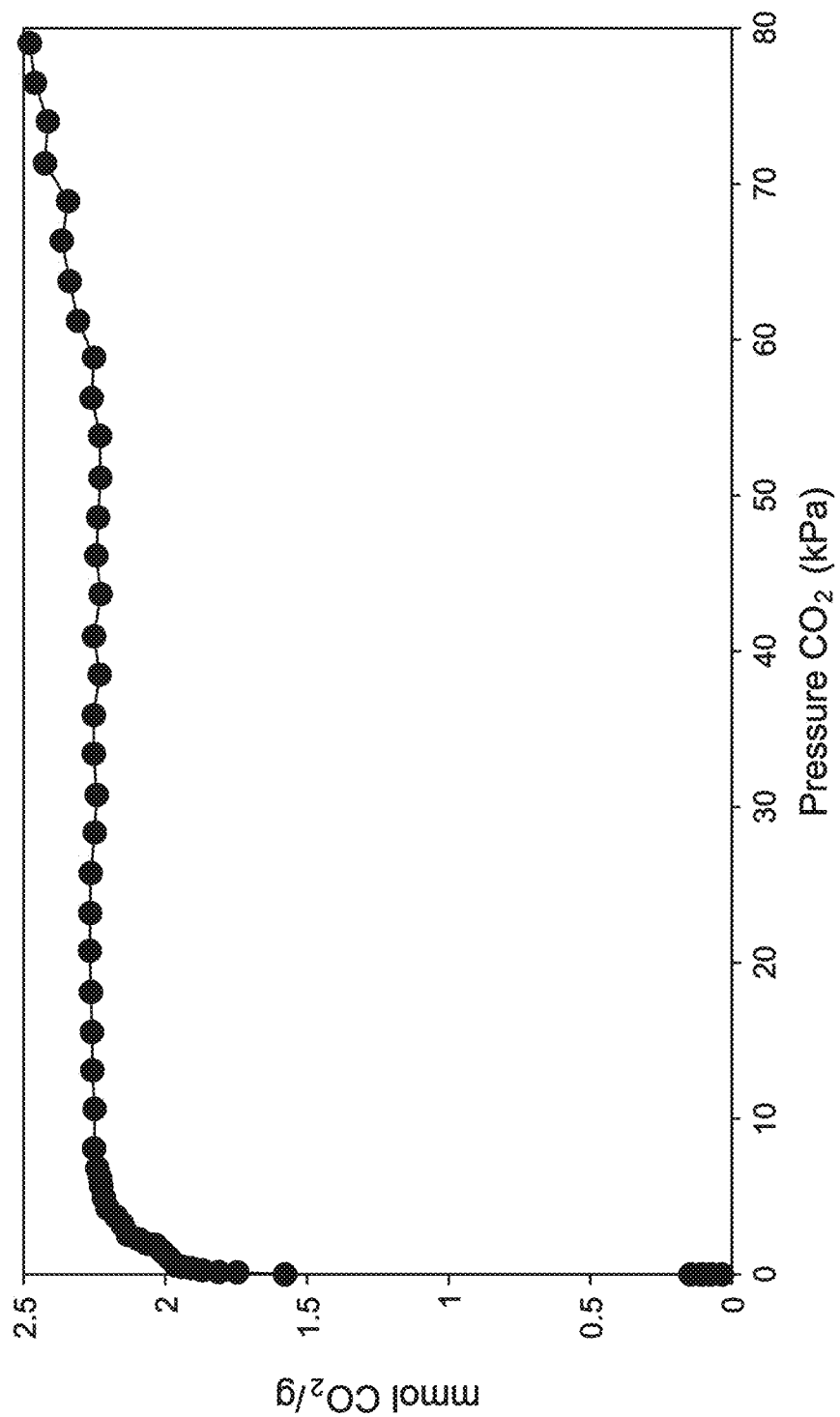
FIG. 9 is a $CO_2$ isotherm for the metal-organic framework system 2 of Example 3.
Figure 10:
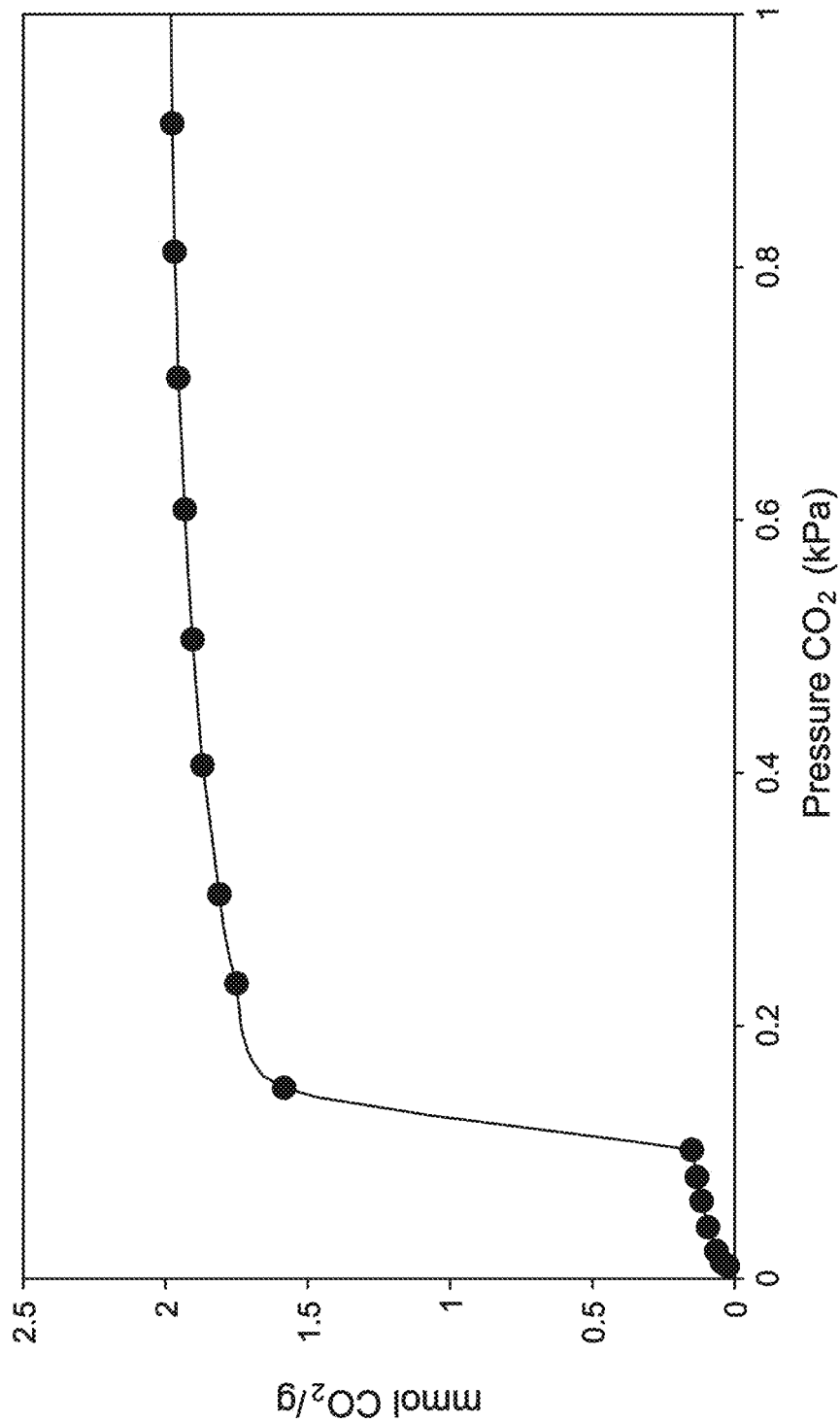
FIG. 10 is the $CO_2$ isotherm of FIG. 9 where the X-axis is restricted to clearly display the presence of Type-V isothermal behavior.

As shown in FIG. 8, the metal-organic framework system 2 was further analyzed by $^1$H NMR spectroscopy. Relative to the integration of a pair of protons on the linker (singlet, 7.95 ppm), the integration of the four most upfield multiplets should sum to 10 for a 100% appended material. In this instance, they summed to 11, indicating 110% amine loading. The metal-organic framework system 2 also displayed the desired type-V isotherm behavior. FIG. 9. In FIG. 10, the x-axis of the $CO_2$ isotherm of the metal-organic framework system 2 was restricted from 0-1 kPa to more clearly display the presence of Type-V isothermal behavior.

In another method of amine appending, the entire apparatus was placed in an oven and heated to the appropriate temperature to vaporize the amine. By heating the entire system, the amine remained in the vapor phase and did not condense or solidify on the frit of the funnel. This approach is particularly useful for amines such as 2-ampd, spermine, and triethylenetetramine, which are shown below.

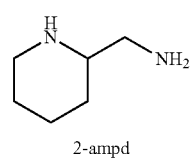

2-ampd

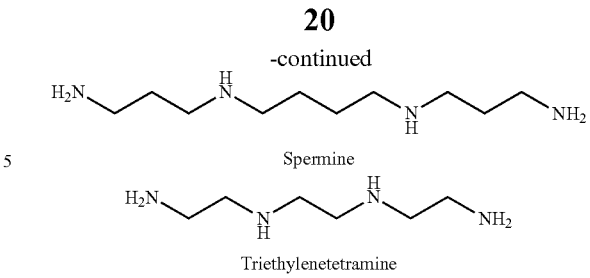

Spermine

Triethylenetetramine

Example 5

Recycling a Metal-Organic Framework System Detachment of a Diamine Ligand from the Metal-Organic Framework MOF-274

As described herein, the metal-organic framework, MOF-274 can be functionalized with a diamine to form a leading candidate for $CO_2$ capture applications due to affording a desirable Type-V isotherm. Installation of different diamines (ligands) changes the adsorbent properties, including impartation of steam stability or variation of the $CO_2$ partial pressure/temperature needed to effect $CO_2$ adsorption. This versatility allows the diamine-appended metal-organic framework (MOF-274), a metal organic framework system, to have potential utility for $CO_2$ capture from a wide range of different streams.

Once the metal-organic framework, MOF-274, is appended with a selected amine, the current paradigm is that the material remains in that particular form throughout the duration of its use. Little attention has been given to the recycle of spent diamine-appended MOF-274, metal-organic framework system, or the intentional stripping and detachment of the ligand/amine from the metal-organic framework MOF-274 for the purposes of loading a different diamine and achieving different performance. Moreover, as new advantaged amine-appended MOF-274 materials are discovered, the ability to upgrade the adsorbent system through installation of new diamines, eliminating de novo metal organic framework synthesis, will minimize expense, waste, and adsorbent downtime.

In this example, a diamine was stripped from a metal-organic framework system and subsequently, a different diamine was appended (attached/bound) to the metal-organic framework. As shown, the recycled diamine-appended MOF-274 adsorbents displayed the desired type-V isotherms, demonstrating a surprising stability to sequential soaking in coordinating solvents, as many MOFs are known to decompose, collapse, or suffer pore blockage under similar conditions.

Specifically, an amine-functionalized metal-organic framework MOF-274 $CO_2$ adsorbent was stripped of the amine, while preserving the integrity of the MOF-274 metal-organic framework and re-appended with a different ligand (diamine) for use in CO2 capture.

Figure 11:
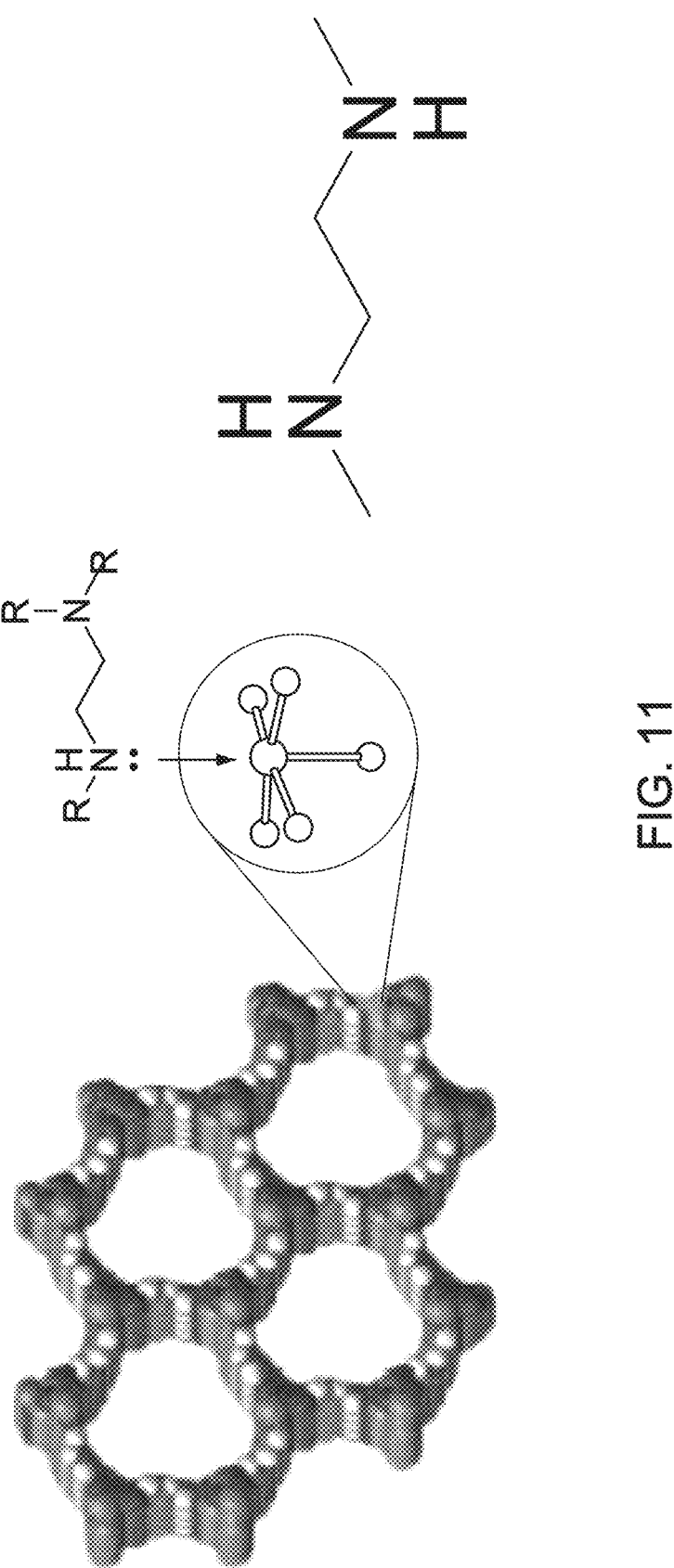
FIG. 11 is a representation of the crystal structure of MOF-274, with diamine coordinating to an open metal site artistically displayed to the right showing the chemical structure of N,N'-dimethylethylenediamine ligand.

A traditional amine-appended metal-organic framework system is mmen@MOF-274, mmen (N,N'-dimethylethylenediamine), as shown in FIG. 11. See Siegelman, T. M., et al., *Controlling Cooperative CO2 Adsorption in Diamine-Appended Mg$_2$ (dobpdc) Metal-Organic Frameworks*, J. Am. Chem. 2017, 139, 1026-1053. In FIG. 11, the representation of the crystal structure of MOF-274 with the diamine coordinating to an open metal site is artistically displayed. To the right of the metal organic framework is the chemical structure of N,N'-dimethylethylenediamine. The metal-organic framework (MOF-274) is appended with mmen to provide the metal-organic framework system referred to herein as mmen@MOF-274.

Figure 12:
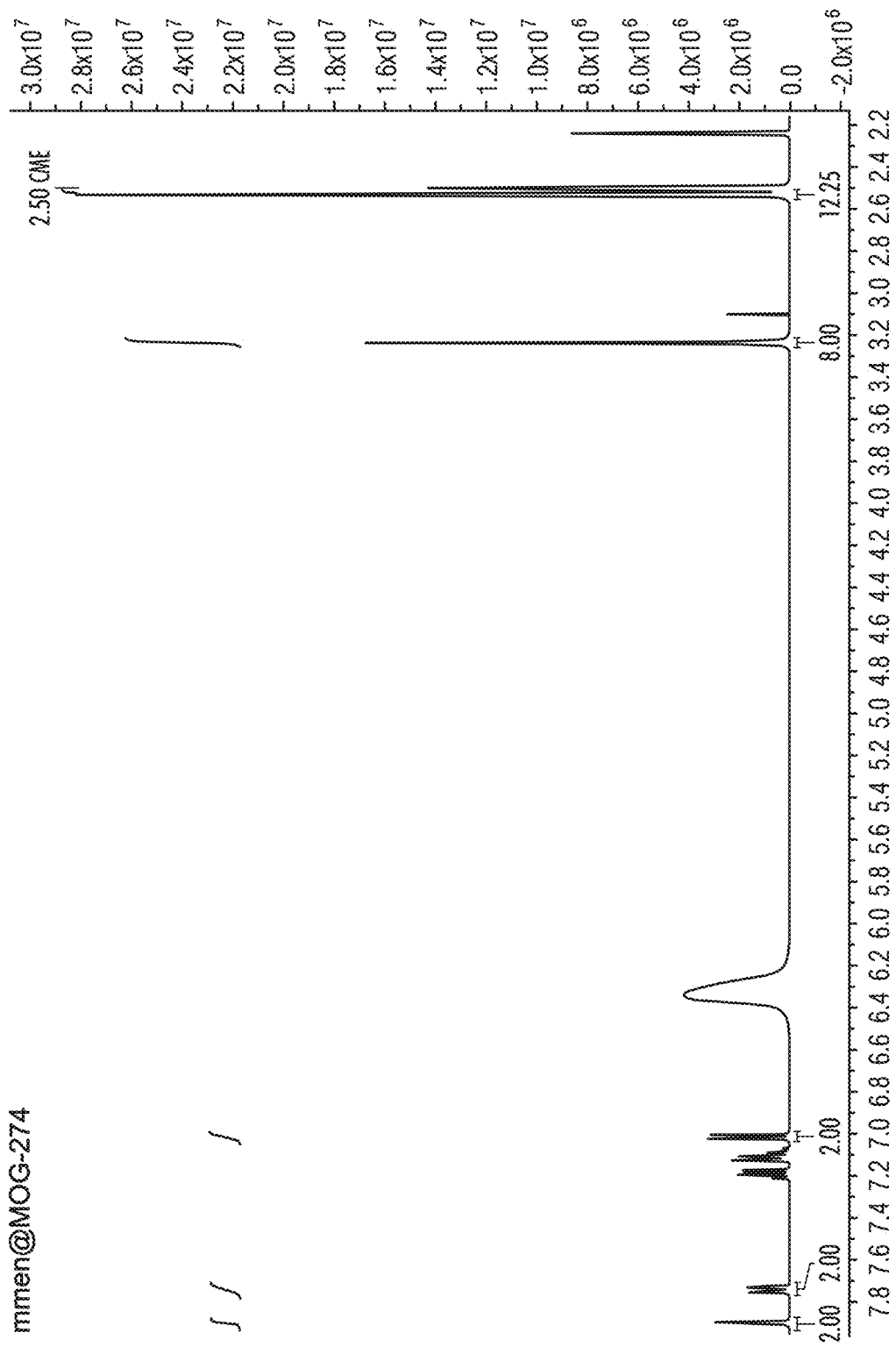
FIG. 12 is a $^1$H NMR spectrum of a metal-organic framework system, mmen@MOF-274, commercially obtained.

As shown in FIG. 12, the extent of amine loading of the metal-organic framework system mmen@MOF-274 was determined by $^1$H NMR. The signature peaks from mmen (the ligand) were located at approximately 3.25 and 2.55 ppm, with theoretical integrations of 8 and 12 (respectively) relative to the aromatic protons on the linker. The three downfield integrations with equal values of 2 were assigned to the aromatic protons of the linker. The experimental integrations for the mmen protons were 8 and 12.25, which were comparable with the theoretical value and indicative of the amine coordinating 100% open metal sites.

Figure 13:
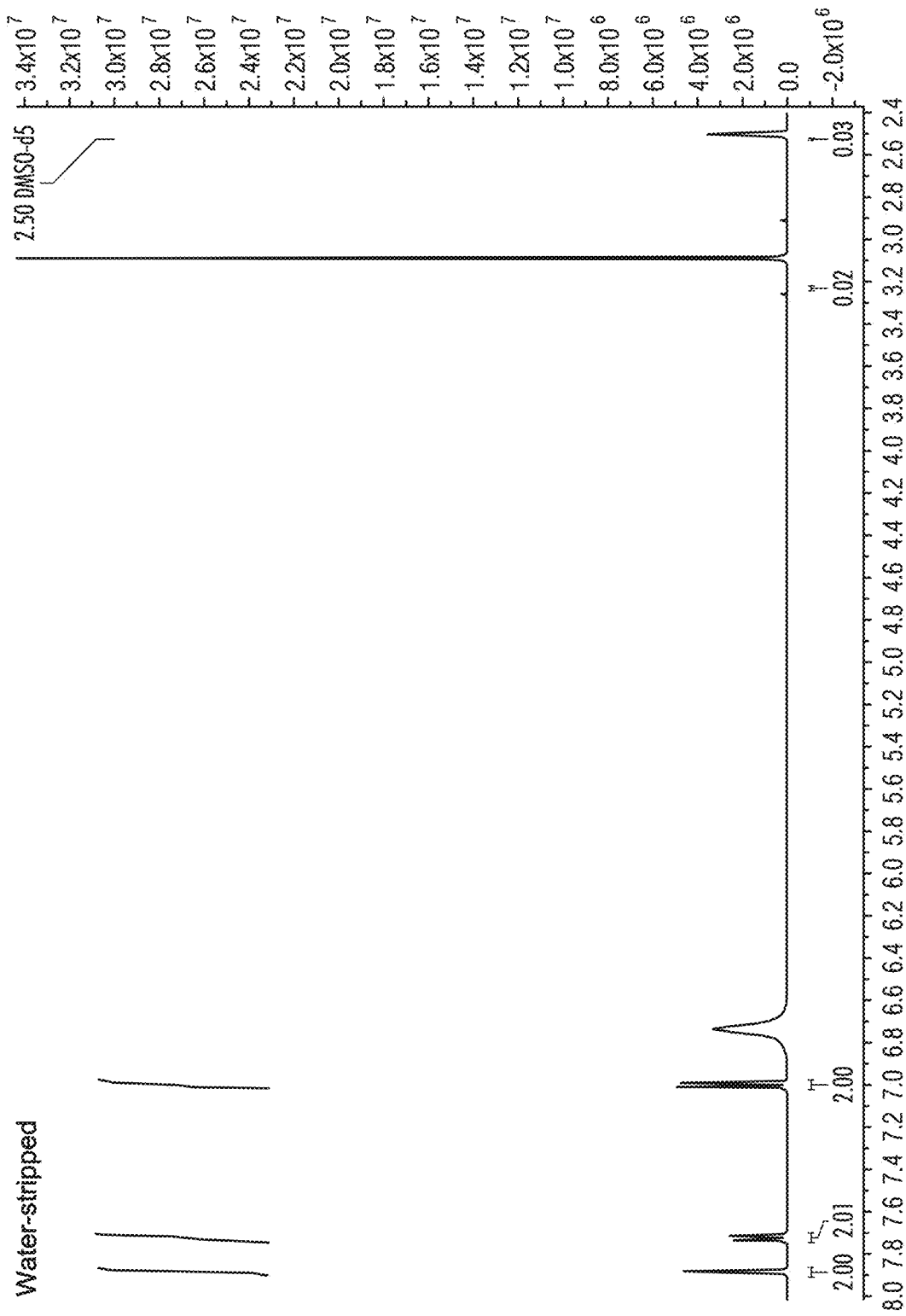
FIG. 13 is a $^1$H NMR spectrum of the metal-organic framework system, mmen@MOF-274, following soaking in water.
Figure 14:
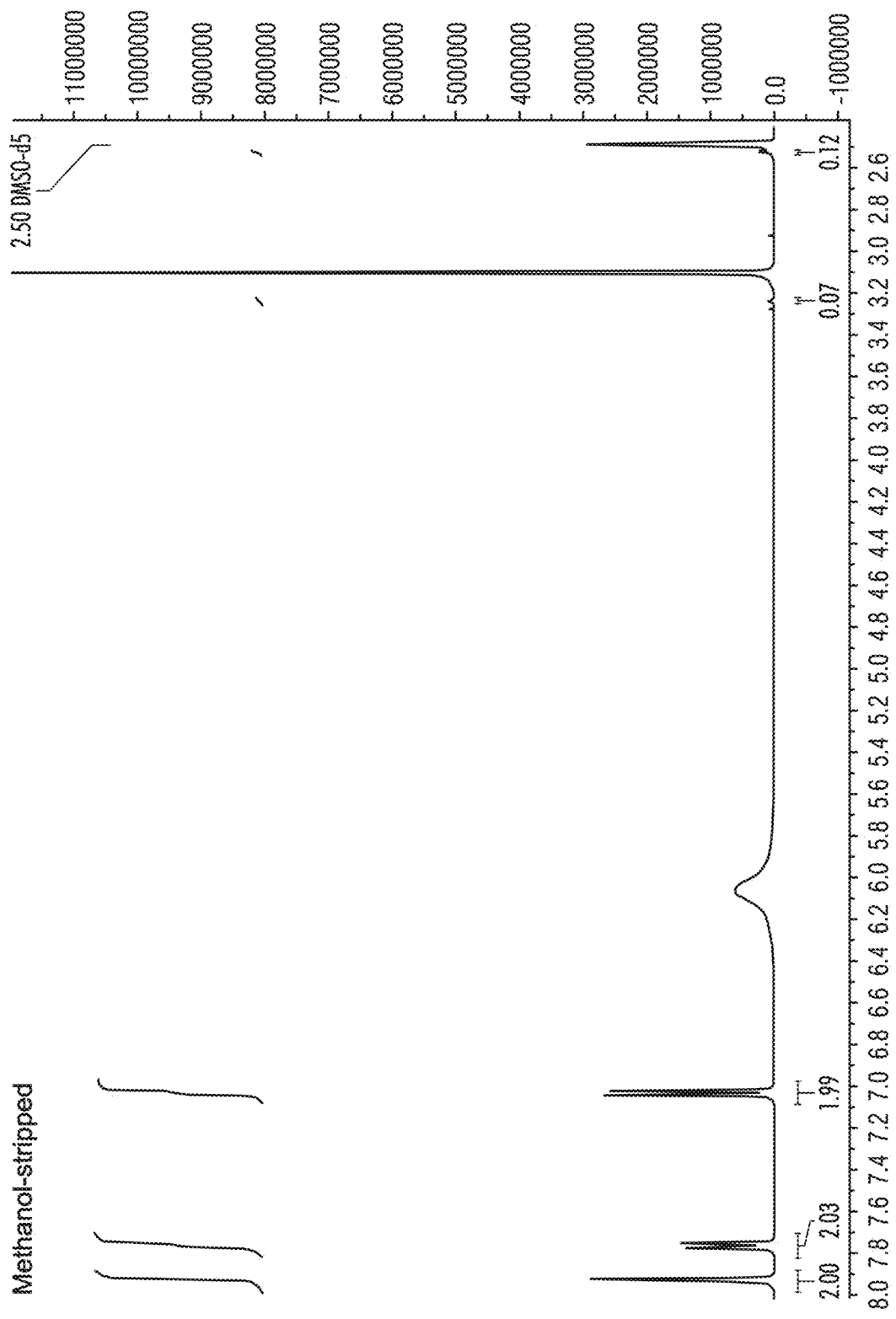
FIG. 14 is a $^1$H NMR spectrum of the metal-organic framework system, mmen@MOF-274 following soaking in methanol.
Figure 15:
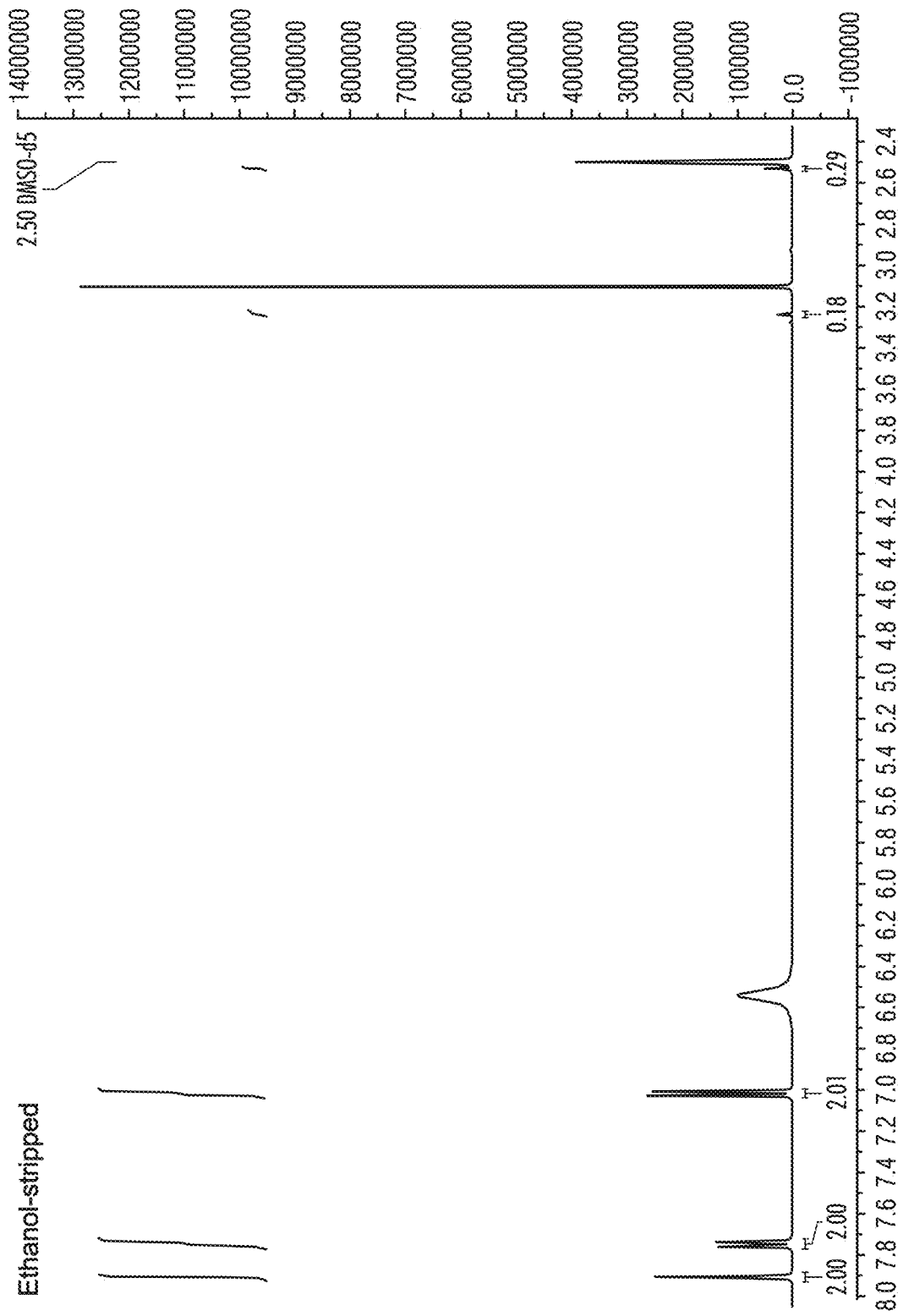
FIG. 15 is a $^1$H NMR spectrum of the metal-organic framework system, mmen@MOF-274 following soaking in ethanol.

Samples of the metal-organic framework system, mmen@MOF-274, were soaked in (1) water, (2) methanol, and (3) ethanol over 24 hours and collected by centrifugation. FIG. 13, FIG. 14 and FIG. 15 show the respective $^1$H NMR spectra collected on the mmen@MOF-274 materials after soaking and digestion. The peaks ascribed to the ligand, mmen, are effectively eliminated, indicative of complete stripping of the ligand from the metal-organic framework system.

Specifically, FIG. 13 shows the $^1$H NMR of the metal-organic framework system mmen@MOF-274 following soaking in water. The peaks for mmen integrate to values suggesting greater than 99.5% of the ligand was removed. FIG. 14 shows the $^1$H NMR of this metal-organic framework system following soaking in methanol. The peaks for the ligand, mmen, integrate to values suggesting 99% of the amine was removed. FIG. 15 shows the $^1$H NMR of the same metal-organic framework system (mmen@MOF-274) following soaking in ethanol. The peaks for the ligand mmen integrate to values suggesting 97.75% of the amine was removed from the metal-organic framework system.

Figure 16:
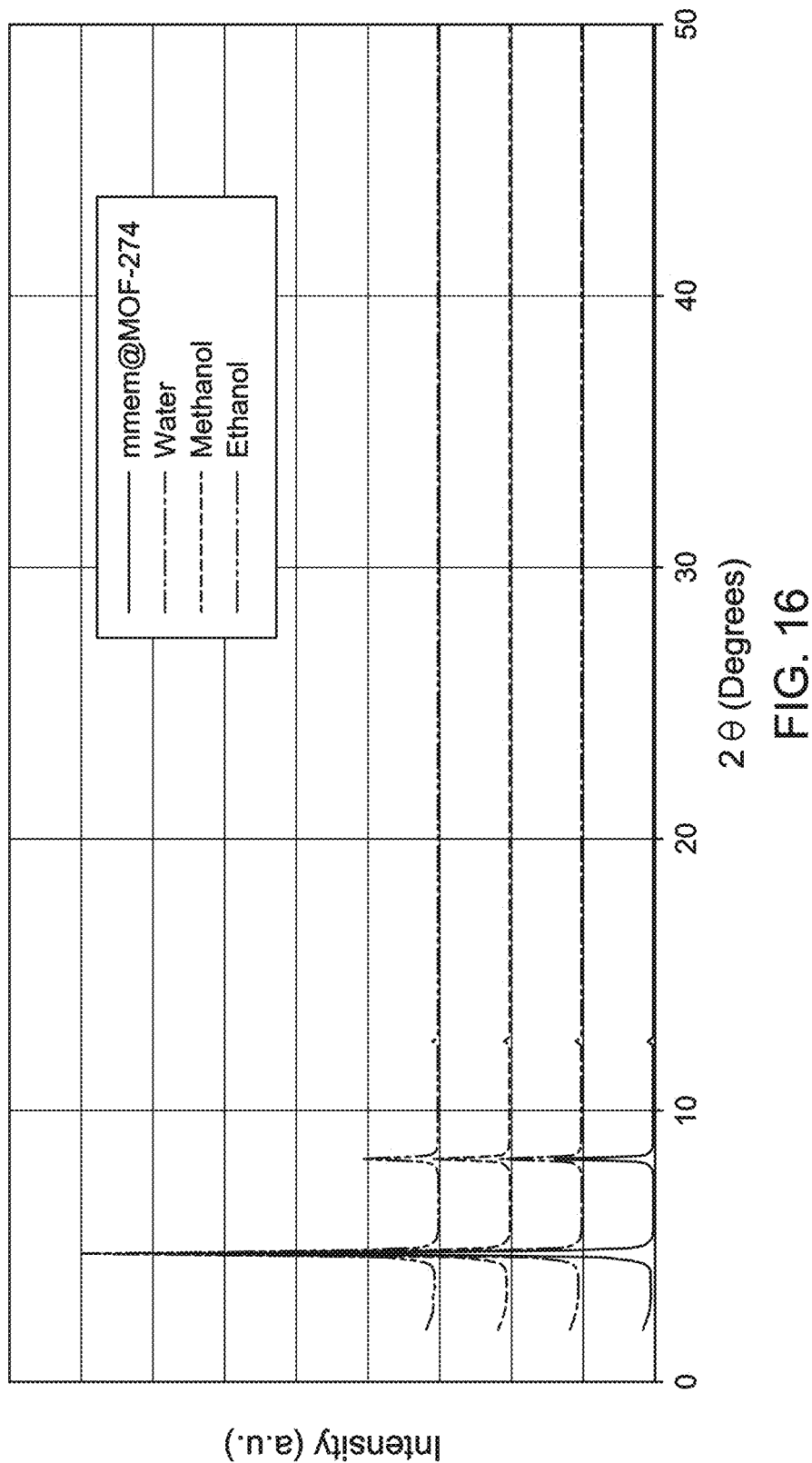
FIG. 16 is a comparison of powder x-ray diffraction patterns for the metal-organic framework system, mmen@MOF-274 and the metal-organic framework, MOF-274, where the ligand, mmen was stripped with water, methanol, or ethanol.

FIG. 16 shows a comparison of powder x-ray diffraction data for the metal-organic framework system, mmen@MOF-274, and the metal-organic framework MOF-274 after the ligand was stripped with water, methanol and ethanol. The indistinguishable diffraction data indicate the crystallinity of metal-organic framework was preserved throughout the stripping process.

Figure 17A:
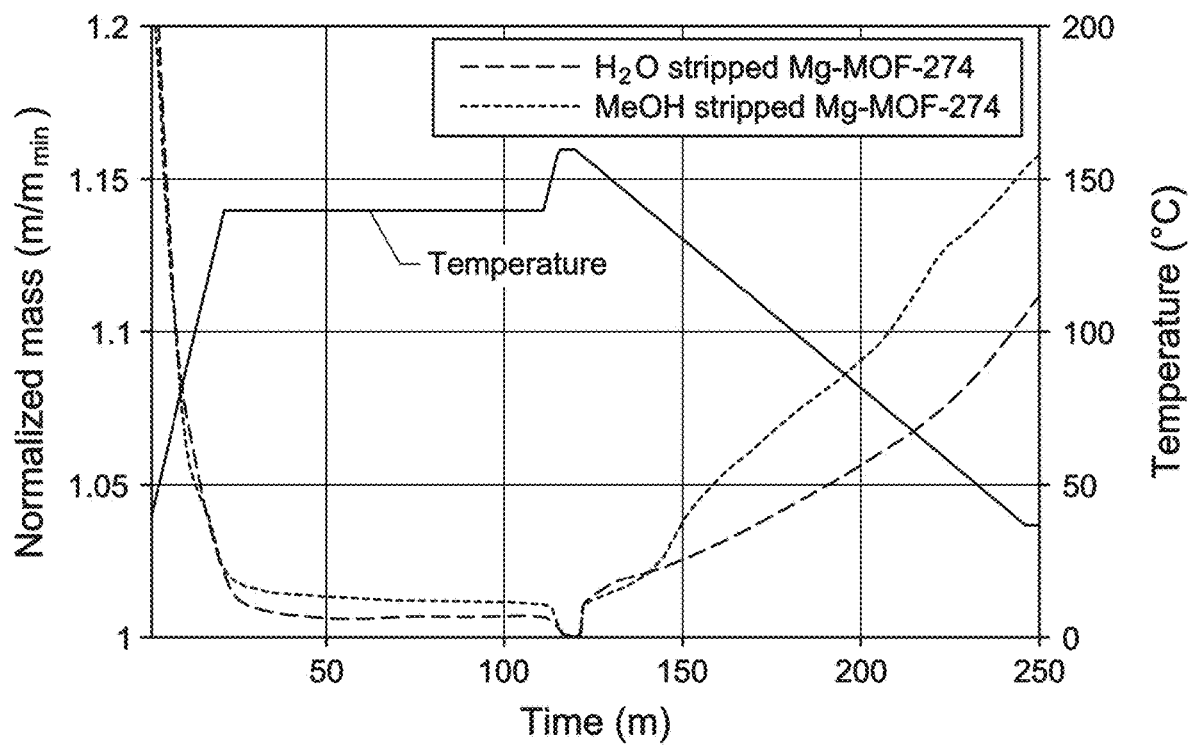
FIG. 17A and FIG. 17B are $CO_2$ isobars for the metal-organic framework following stripping of the mmen from the metal-organic framework system, mmen@MOF-274 with water or methanol, and water and methanol respectively.

As shown in FIG. 17A, $CO_2$ adsorption performance of the metal-organic framework MOF-274 obtained by stripping mmen with water or methanol was assessed via $CO_2$ isobars. Due to the removal of the amine, the desired Type-V isotherm was not observed. The obtained $CO_2$ capacities demonstrated 2.72-3.41 mmol $CO_2$/g MOF-274 (100-150 mg $CO_2$/g MOF-274) was adsorbed below 40° C., attesting to the overall preservation of accessible surface area in the metal-organic framework. Comparable data are not yet available for the mmen@MOF-274 stripped with ethanol.

Figure 17B:
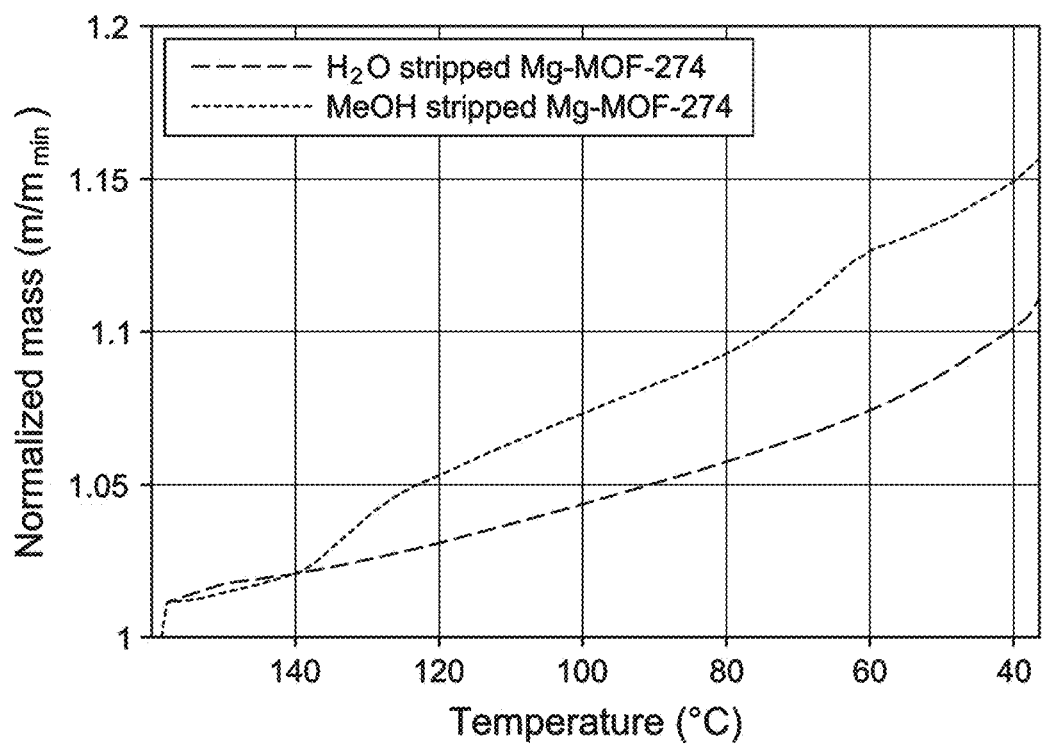

FIG. 17B shows the $CO_2$ adsorption isobars for the metal-organic framework, MOF-274, prepared by stripping mmen with water and methanol. In these cases, the coordinating solvent was not washed away with a non-coordinating solvent (e.g., toluene). The resulting capacity of the recycled metal-organic framework system is lower than theoretical, potentially due to bound coordinating solvent, where $H_2O$ is more tightly bound than MeOH.

Multiple different stripping solvents were demonstrated effective for diamine removal, which may provide pronounced benefits if implemented at scale, and may even facilitate subsequent recovery and recycle of the coordinating diamine. The stripping solution can be matched with the coordinated diamine to ensure complete removal, while simultaneously providing multiple options for process flexibility and optimization.

Example 6

Recycled and Repurposed Metal Organic Framework Systems

After amine removal described in Example 4, the metal-organic frameworks were immersed in a 20 vol % of 2-aminomethylpiperidine ("2-ampd") ligand in toluene solution to generate the metal-organic framework system, 2-ampd@MOF-274. These samples (recycled metal-organic framework systems) were characterized by digestion and $^1$H NMR. The characteristic peaks for the recycled metal-organic framework system are located from 1.25-2.0 ppm and will have a theoretical integral value of 12 if fully loaded within the metal-organic framework MOF-274.

Figure 18:
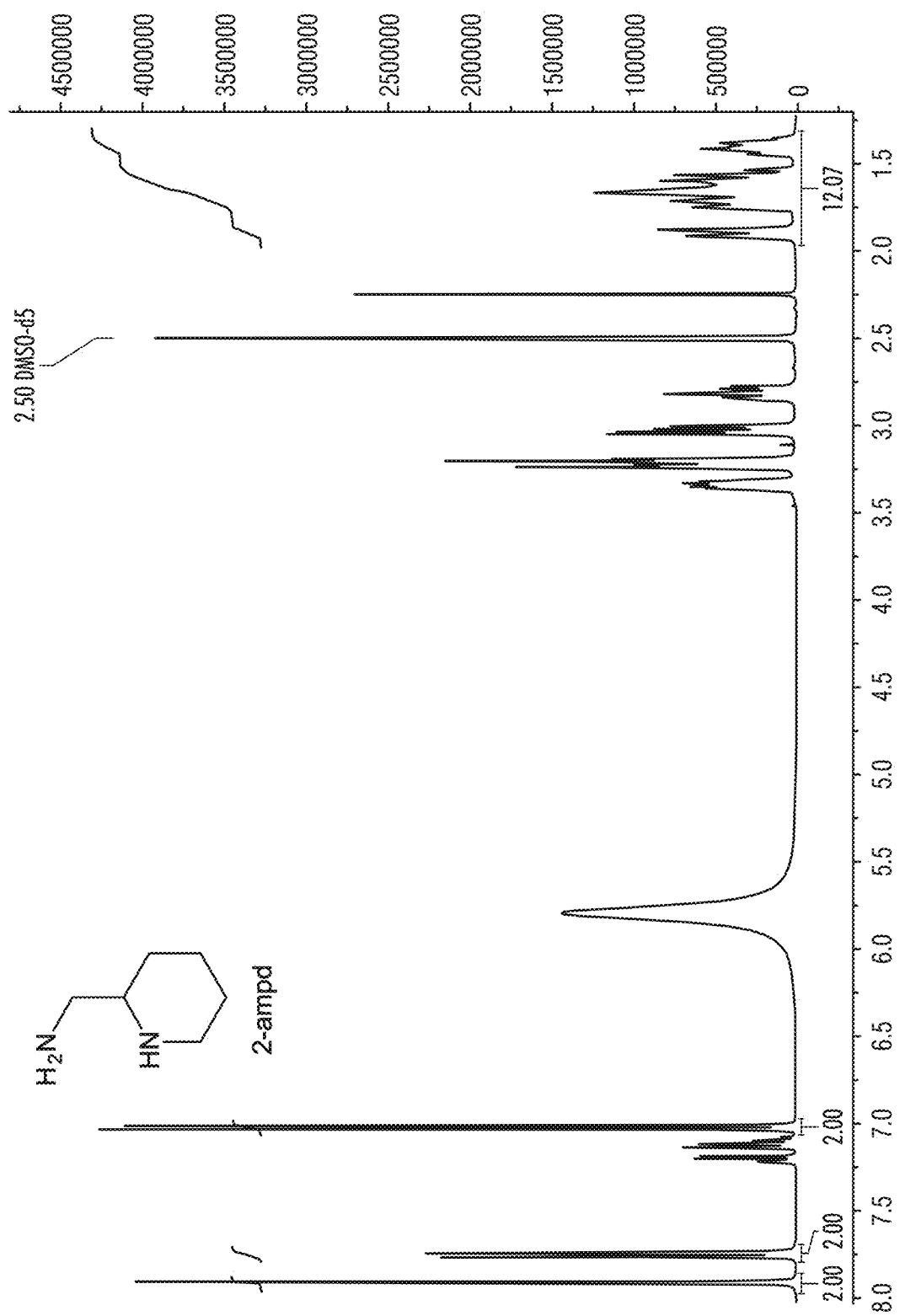
FIG. 18 is a $^1$H NMR spectrum of a recycled metal-organic framework system where a plurality of first appended ligands, 2-ampd of the metal-organic framework system had been stripped using water and the metal-organic framework (MOF-274) was re-appended with a plurality of second appended ligands, also 2-ampd.
Figure 19:
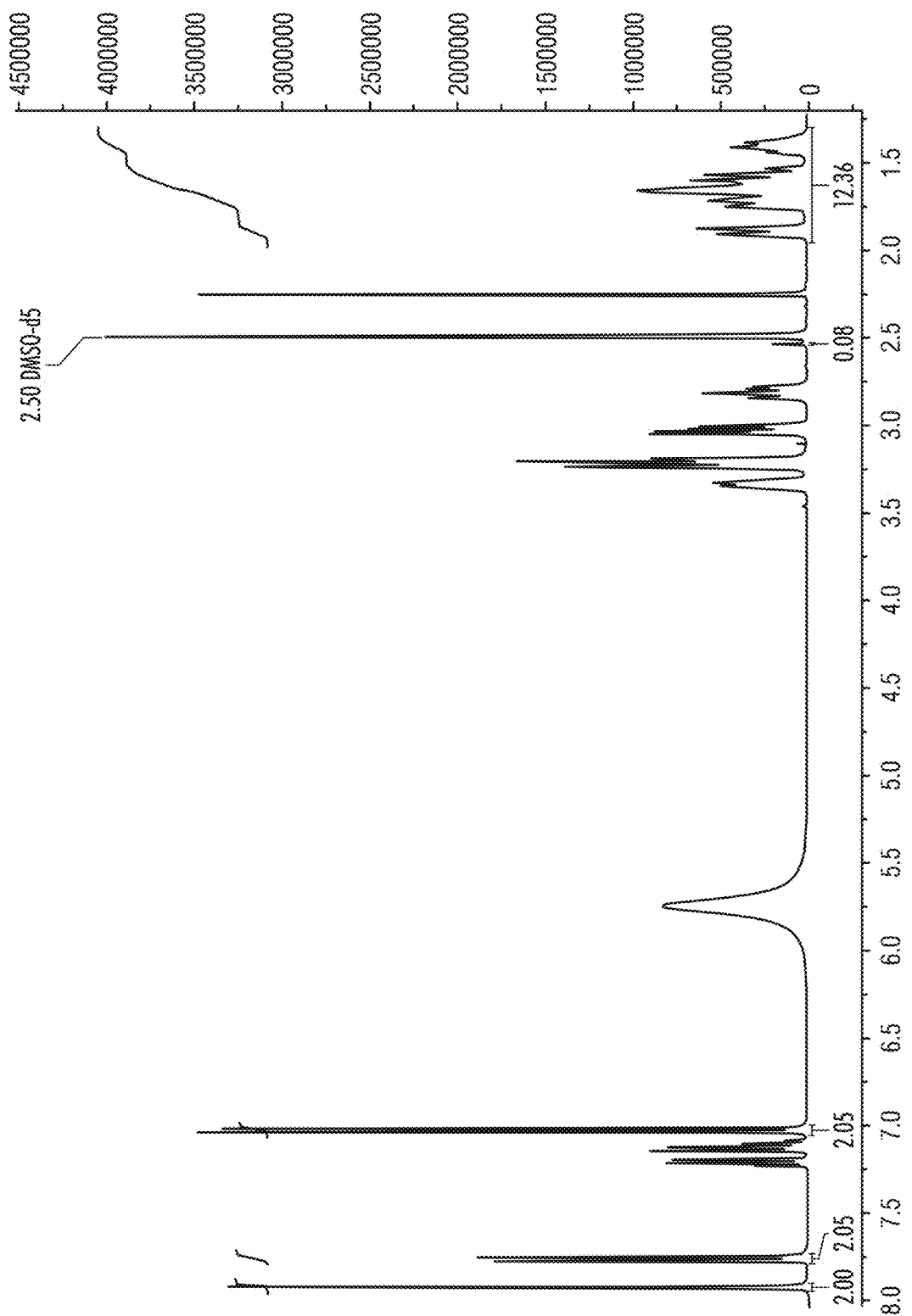
FIG. 19 is a $^1$H NMR spectrum of the recycled metal-organic framework system obtained from the metal-organic framework system (MOF-274 with mmen) where the plurality of first appended ligands, mmen, were stripped using methanol, and a plurality of second appended ligands, 2-ampd, were appended to the metal-organic framework
Figure 20:
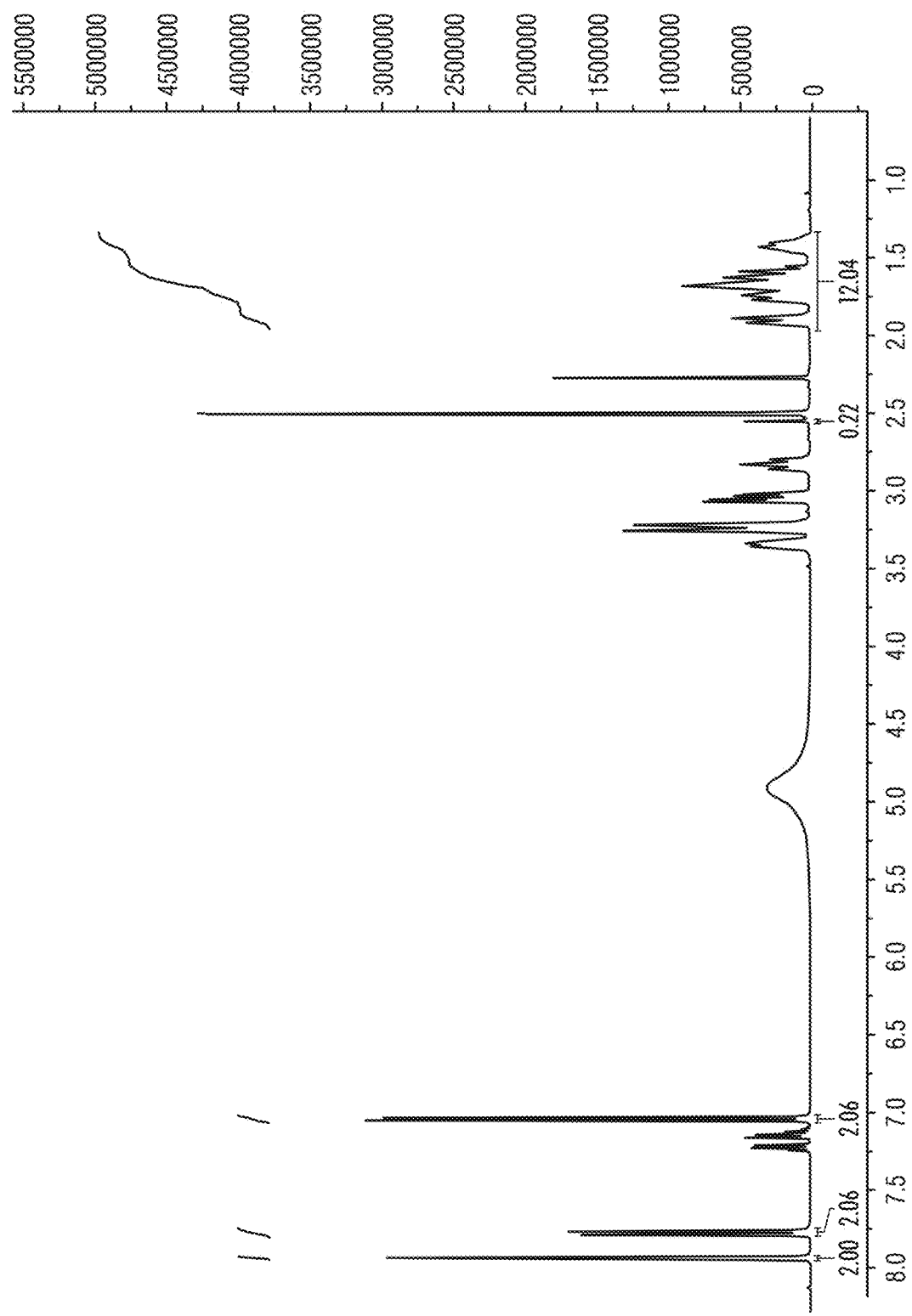
FIG. 20 is the $^1$H NMR of metal-organic framework system comprising the metal-organic framework system MOF-274 appended with the plurality of first appended ligands, mmen, stripped using ethanol, and re-appended with a plurality of second appended ligands 2-ampd.

As shown in FIGS. 18-20, the recycled metal-organic framework systems afforded stoichiometric loading. Specially, FIG. 18 shows the $^1$H NMR of the recycled metal-organic framework system where the plurality of first appended ligands, 2-ampd, had been stripped using water and the metal-organic framework (MOF-274) was re-appended with a plurality of second appended ligands, a plurality of second ligands, also 2-ampd. The reference peaks from 1.25-2.0 ppm integrate to a value of 12.07, confirming 100.6% loading of the ligand, 2-ampd, into the metal-organic framework. The diamine 2-aminomethylpiperidine is displayed in the spectrum.

FIG. 19 shows the $^1$H NMR of the recycled metal-organic framework system obtained from the metal-organic framework system (MOF-274 with mmen) comprising a plurality of first appended ligands, mmen, was stripped using methanol and a plurality of second appended ligands, 2-ampd, were then appended to the metal-organic framework MOF-274. The reference peaks from 1.25-2.0 ppm integrate to a value of 12.36, confirming 103% loading of ligand, 2-ampd, into the metal-organic framework. FIG. 20 shows the $^1$H NMR of metal-organic framework system (the metal-organic framework system comprising the metal-organic framework system MOF-274 appended with the plurality of first appended ligands, mmen) was stripped using ethanol and re-appended with a plurality of second appended ligands, 2-ampd. The reference peaks from 1.25-2.0 ppm integrate to a value of 12.04, confirming 100.3% loading of ligands, 2-ampd, onto the metal-organic framework, MOF-274.

Figure 21:
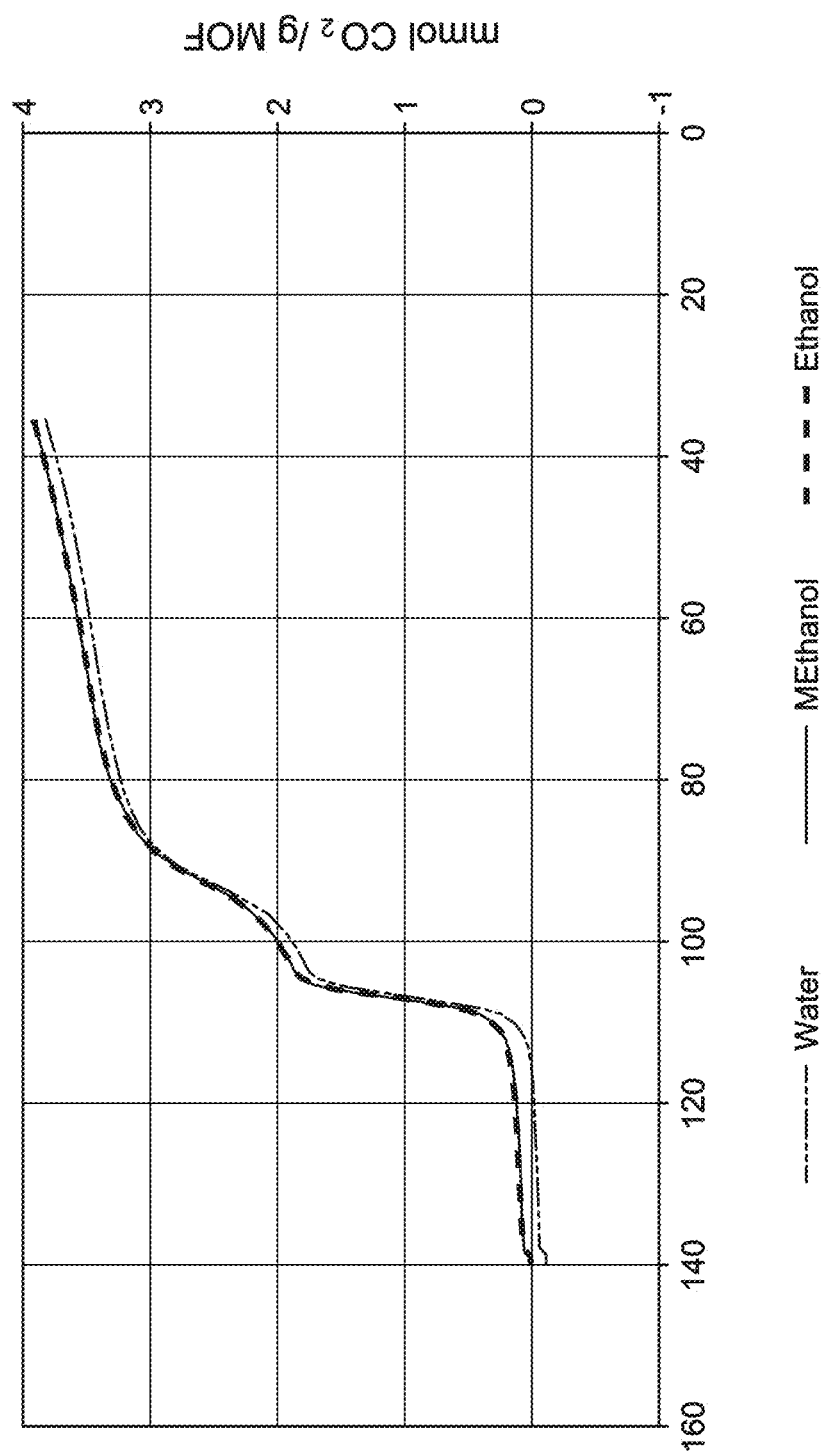
FIG. 21 is the $CO_2$ isobars of samples described in Example 5 and shown in FIG. 18, FIG. 19 and FIG. 20.

The $CO_2$ isobars of samples of FIG. 18, FIG. 19 and FIG. 20 are shown in FIG. 21. As shown in FIG. 21, the samples of the recycled metal-organic framework systems displayed an update which is near the theoretical maximum of 4 mmol $CO_2$/g metal-organic framework. For all samples, experimental $CO_2$ uptake was just below the theoretical maximum value of 4 mmol $CO_2$/g of the metal-organic framework system, demonstrating the framework integrity was not impacted by mmen stripping and 2-ampd appending, and confirming the potential viability of this approach to transform the diamine-appended MOF-274 metal-organic framework system to a recycled metal-organic framework system.

The invention claimed is:

1. A method of synthesizing a metal-organic framework system comprising a metal-organic framework and a plurality of ligands appended to the metal-organic framework, the method comprising the steps of:
   providing a metal-organic framework comprising a plurality of one or more distinct metallic elements and a plurality of linkers, the metal-organic framework comprising at least one open metal site; and appending a ligand in a vapor-phase to the metal-organic framework at the open metal site to form the metal-organic framework system.

2. A method of making a metal-organic framework system comprising the steps of:
   making a metal-organic framework comprising a plurality of one or more distinct metallic elements and a plurality of linkers, wherein the metal-organic framework comprises a plurality of open metal sites, and wherein a linker bridges at least one of the plurality of the open metal sites to another;
   evaporating a plurality of ligands to produce a vapor-phase; and
   in the vapor-phase, binding the at least one of the plurality of ligands to the at least one of the open metal sites of the metal-organic framework to form the metal-organic framework system.

3. The method of claim 2, further comprising the step of suspending the metal-organic framework in a solvent.

4. The method of claim 3, further comprising the step of filtering the solvent from the metal-organic framework.

5. The method of claim 2, wherein the plurality of ligands is heated to form the vapor-phase.

6. The method of claim 2, wherein an inert gas passes through the vapor-phase.

7. The method of claim 6, wherein the inert gas is nitrogen.

8. A method of recycling metal-organic framework system comprising the steps of:
   detaching a plurality of first appended ligands from the metal-organic framework system to provide a metal-organic framework, wherein the metal-organic framework remains intact, the metal-organic framework comprising a plurality of one or more distinct metallic elements and a plurality of linkers; and
   appending at least one of a plurality of second appended ligands to the metal-organic framework to produce a recycled metal-organic framework system.

9. The method of claim 8, further comprising the step of sequential soaking of the metal-organic framework system and metal-organic framework to provide a recycled metal-organic framework system.

10. The method of claim 8, further comprising the step of washing the metal-organic framework system in solvent to remove the plurality of first appended ligands.

11. The method of claim 8, further comprising the step of appending the at least one plurality of second appended ligands to the metal-organic framework in a vapor-phase.

12. The method of claim 8, wherein the plurality of first appended ligands are spent diamine-appended ligands.

13. The method of claim 8, wherein the plurality of second appended ligands are the plurality of first appended ligands recycled.

14. The method of claim 8, wherein the plurality of first appended ligands are different than the plurality of second appended ligands.

15. The method of claim 8, wherein the metal-organic framework system comprises a diamine appended to the metal organic framework.

16. The method of claim 8, wherein each of the plurality of one or more distinct metallic elements are bridged by one or more of the plurality of linkers to form a metal site.

17. The method of claim 16, wherein the plurality of one or more distinct metallic elements comprise magnesium, zinc, nickel, copper, and/or a combination thereof.

18. The method of claim 17, wherein the distinct metallic element is Mg.

19. The method of claim 1, wherein the ligand is an amine.

20. The method of claim 2, wherein the plurality of ligands is an alcohol.

21. The method of claim 2, wherein the linker is a multidentate organic ligand comprising a first binding site and a second binding site that are bridged together with a third binding site.

22. The method of claim 21, wherein the first binding site and second binding site of the multidentate organic ligand each comprise a salicylate moiety and the third binding site comprises a diamine moiety.

23. The method of claim 22, wherein the multidentate organic linker is 5, 5'-(((1E,2E)-ethane-1,2-diylidene)bis-(azaneylylidene))bis(2-hydrozybenzoic acid).

* * * * *